United States Patent
Sakata et al.

(10) Patent No.: US 9,906,077 B2
(45) Date of Patent: Feb. 27, 2018

(54) WIRELESS POWER TRANSMISSION SYSTEM AND POWER TRANSMISSION APPARATUS

(71) Applicant: Panasonic Intellectual Property Management Co., Ltd., Osaka (JP)

(72) Inventors: Tsutomu Sakata, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/614,735

(22) Filed: Jun. 6, 2017

(65) Prior Publication Data

US 2017/0271927 A1 Sep. 21, 2017

Related U.S. Application Data

(63) Continuation of application No. PCT/JP2016/000599, filed on Feb. 5, 2016.

(30) Foreign Application Priority Data

Sep. 10, 2015 (JP) .................. 2015-178556

(51) Int. Cl.
*H02J 50/00* (2016.01)
*H02J 50/12* (2016.01)
(Continued)

(52) U.S. Cl.
CPC .............. *H02J 50/12* (2016.02); *H02J 50/80* (2016.02); *H04B 5/0037* (2013.01); *H04B 5/0081* (2013.01); *H02J 50/00* (2016.02)

(58) Field of Classification Search
CPC .. H02J 50/12; H02J 50/80; H02J 50/00; H02J 7/025; H04B 5/0037; H04B 5/0081
See application file for complete search history.

(56) References Cited

U.S. PATENT DOCUMENTS

2010/0172168 A1* 7/2010 Fells .................. H02J 7/025
363/164
2012/0202435 A1* 8/2012 Kim .................. H04B 5/0037
455/69
(Continued)

FOREIGN PATENT DOCUMENTS

| JP | 2008-206305 | 9/2008 |
| JP | 2010-074806 | 4/2010 |
| JP | 2011-211779 | 10/2011 |

OTHER PUBLICATIONS

International Search Report of PCT application No. PCT/JP2016/000599 dated Mar. 8, 2016.

*Primary Examiner* — Jean B Corrielus
(74) *Attorney, Agent, or Firm* — Renner Otto Boisselle & Sklar, LLP

(57) ABSTRACT

A power transmission apparatus includes an inverter circuit, a power transmission antenna that wirelessly transmits alternating current power output from the inverter circuit, and a power transmission control circuit that causes the inverter circuit to output the alternating current power. The power transmission control circuit causes the inverter circuit to output the alternating current power as binary communication data by varying frequency of the alternating current power output from the inverter circuit between a first frequency and a second frequency, and performs amplitude control for eliminating a difference between amplitude of voltage of the alternating current power at a time when the frequency is the first frequency and amplitude of the voltage of the alternating current power at a time when the frequency is the second frequency.

12 Claims, 18 Drawing Sheets

(51) Int. Cl.
*H02J 50/80* (2016.01)
*H04B 5/00* (2006.01)

(56) References Cited

U.S. PATENT DOCUMENTS

| | | | |
|---|---|---|---|
| 2013/0020879 A1 | 1/2013 | Kihara et al. | |
| 2014/0015335 A1* | 1/2014 | Lee | H01F 38/14 307/104 |
| 2015/0054456 A1* | 2/2015 | Yamakawa | H01M 10/44 320/108 |
| 2015/0061577 A1* | 3/2015 | Ye | H02J 7/025 320/108 |
| 2015/0061580 A1* | 3/2015 | Yamakawa | H01M 10/44 320/108 |
| 2015/0097438 A1* | 4/2015 | Aioanei | H02J 7/025 307/104 |
| 2016/0181818 A1* | 6/2016 | Joye | H02J 5/005 307/104 |
| 2016/0285278 A1* | 9/2016 | Mehas | H02J 50/12 |

* cited by examiner

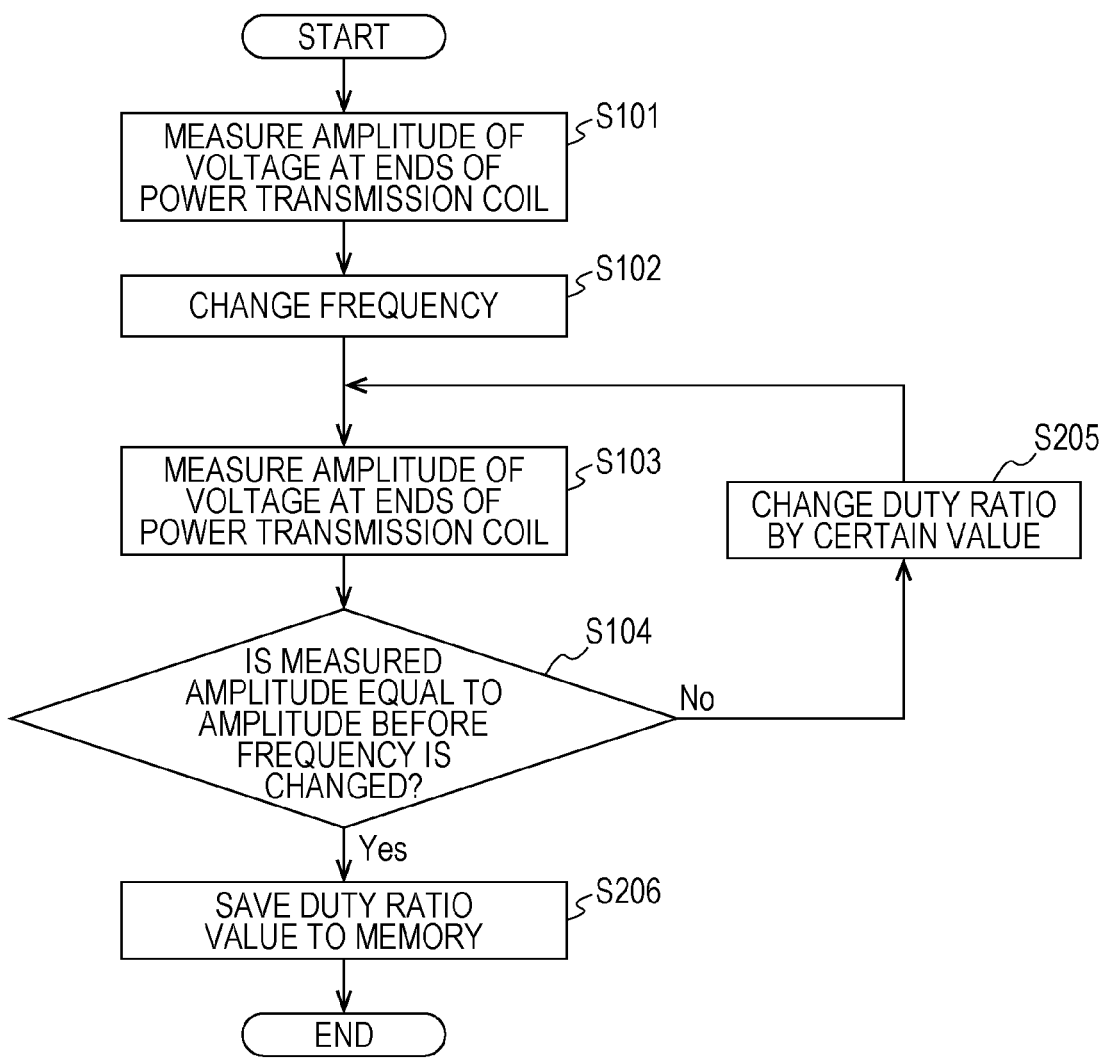

WIRELESS POWER TRANSMISSION SYSTEM AND POWER TRANSMISSION APPARATUS

BACKGROUND

1. Technical Field

The present invention relates to a wireless power transmission system and a power transmission apparatus that wirelessly transmit power.

2. Description of the Related Art

During these years, wireless (noncontact) power transmission techniques for wirelessly (in a noncontact manner) transmitting power to mobile devices such as mobile phones and electric vehicles are being developed. When power is transmitted in a wireless power transmission system, communication between a power transmission apparatus and a power reception apparatus needs to be established for safety purposes.

Transmission of data from the power reception apparatus to the power transmission apparatus is performed, for example, using a load modulation method, in which a value of a load is varied using switching elements included in the power reception apparatus. By transmitting the variation in the load to the power transmission apparatus, data can be transmitted. On the other hand, in an application (e.g., radio-frequency identification (RFID)) in which data needs to be transmitted from a power transmission side to a power reception side, data can be transmitted from the power transmission apparatus to the power reception apparatus, for example, by modulating the frequency of power to be transmitted (hereinafter also referred to as "transmission power").

Such data communication from a power reception apparatus to a power transmission apparatus and data communication from a power transmission apparatus to a power reception apparatus are disclosed, for example, in Japanese Unexamined Patent Application Publication No. 2011-211779 and Japanese Unexamined Patent Application Publication No. 2008-206305.

SUMMARY

In the existing art, however, while one of a power transmission apparatus and a power reception apparatus is transmitting data to the other, it is difficult for the other transmit data to the one. Waiting time is thus generated when bidirectional data communication is performed, and it takes a long time to complete the communication.

In one general aspect, the techniques disclosed here feature a wireless power transmission system including a power transmission apparatus including an inverter circuit that converts first direct current power supplied from a power supply into alternating current power and outputs the alternating current power, a power transmission antenna that wirelessly transmits the alternating current power output from the inverter circuit, and a power transmission control circuit that causes the inverter circuit to output the alternating current power and outputs the alternating current power as binary communication data by varying frequency of the alternating current power output from the inverter circuit between a first frequency and a second frequency, and a power reception apparatus including a power reception antenna that receives the alternating current power wirelessly transmitted from the power transmission antenna, and a power reception amplitude modulator that varies amplitude of voltage of the alternating current power input to the power transmission antenna between a first amplitude and a second amplitude. When transmitting first binary communication data to be output from the power transmission antenna to the power reception antenna through electromagnetic coupling between the power transmission antenna and the power reception antenna, the power transmission control circuit selects the first frequency as one of the first binary communication data and the second frequency as another of the first binary communication data. When transmitting second binary communication data from the power reception antenna to the power transmission antenna through the electromagnetic coupling, the power reception amplitude modulator selects the first amplitude as one of the second binary communication data and the second amplitude as another of the second binary communication data. The power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

According to the aspect of the present disclosure, the power transmission apparatus and the power reception apparatus can simultaneously transmit data bidirectionally, and time taken to complete bidirectional communication can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a flowchart illustrating an example of operations performed when Tx data is transmitted;

DETAILED DESCRIPTION

Underlying Knowledge Forming Basis of Present Disclosure

Underlying knowledge forming the basis of the present disclosure will be described before describing embodiments of the present disclosure.

The present inventors have found that the following problem arises with existing wireless power transmission systems described in the "Background Art" section.

The wireless power transmission systems disclosed in Japanese Unexamined Patent Application Publication No. 2011-211779 and Japanese Unexamined Patent Application Publication No. 2008-206305 wirelessly transmit power between a power transmission coil (primary coil) and a power reception coil (secondary coil) through electromagnetic inductance. In these systems, data communication from a power reception side to a power transmission side is performed by modulating a load in a power reception apparatus. A power transmission apparatus can read data (hereinafter also referred to as "Rx data") transmitted from the power reception apparatus by detecting changes in a waveform of a voltage at both ends of the power transmission coil caused by the modulation of the load. On the other hand, data communication from the power transmission side to the power reception side is performed, for example, by modulating the frequency of transmission power. The power reception apparatus can read data (hereinafter also referred to as "Tx data") transmitted from the power transmission side by detecting changes in the frequency.

When a timing of the data transmission from the power reception side to the power transmission side and a timing of the data transmission from the power transmission side to the power reception side overlap, however, the amplitude of the voltage of both ends of the power transmission coil varies due to changes in the frequency and changes in the load. In this case, it is difficult for the power transmission apparatus to correctly demodulate Rx data. That is, there is a problem in that the systems disclosed in Japanese Unexamined Patent Application Publication No. 2011-211779 and Japanese Unexamined Patent Application Publication No. 2008-206305 can only perform half-duplex communication.

This problem will be described in more detail hereinafter with reference to the drawings.

Figure 13A:
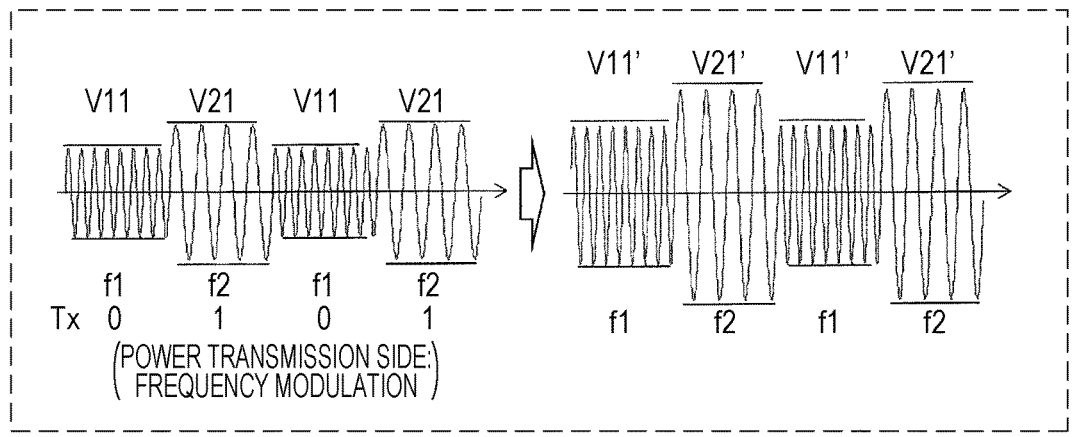
FIG. 13A is a diagram illustrating changes in the amplitude of voltage at a time when a power transmission side transmits Tx data to a power reception side in the existing art.

FIG. 13A is a diagram illustrating changes in the amplitude of voltage at a time when the power transmission side transmits Tx data to the power reception side. A left-side diagram in FIG. 13A illustrates an example of the waveform of the voltage of the power transmission coil (hereinafter also referred to as a "power transmission coil voltage"), and a right-side diagram in FIG. 13A illustrates an example of a waveform of a voltage at both ends of the power reception coil (hereinafter also referred to as a "power reception coil voltage"). In either diagram, a horizontal axis represents time, and this holds true in the following diagrams. In this example, a case is assumed in which a value of the voltage at both ends of the power reception coil is proportional to a value of the voltage at both ends of the power transmission coil.

Figure 13B:
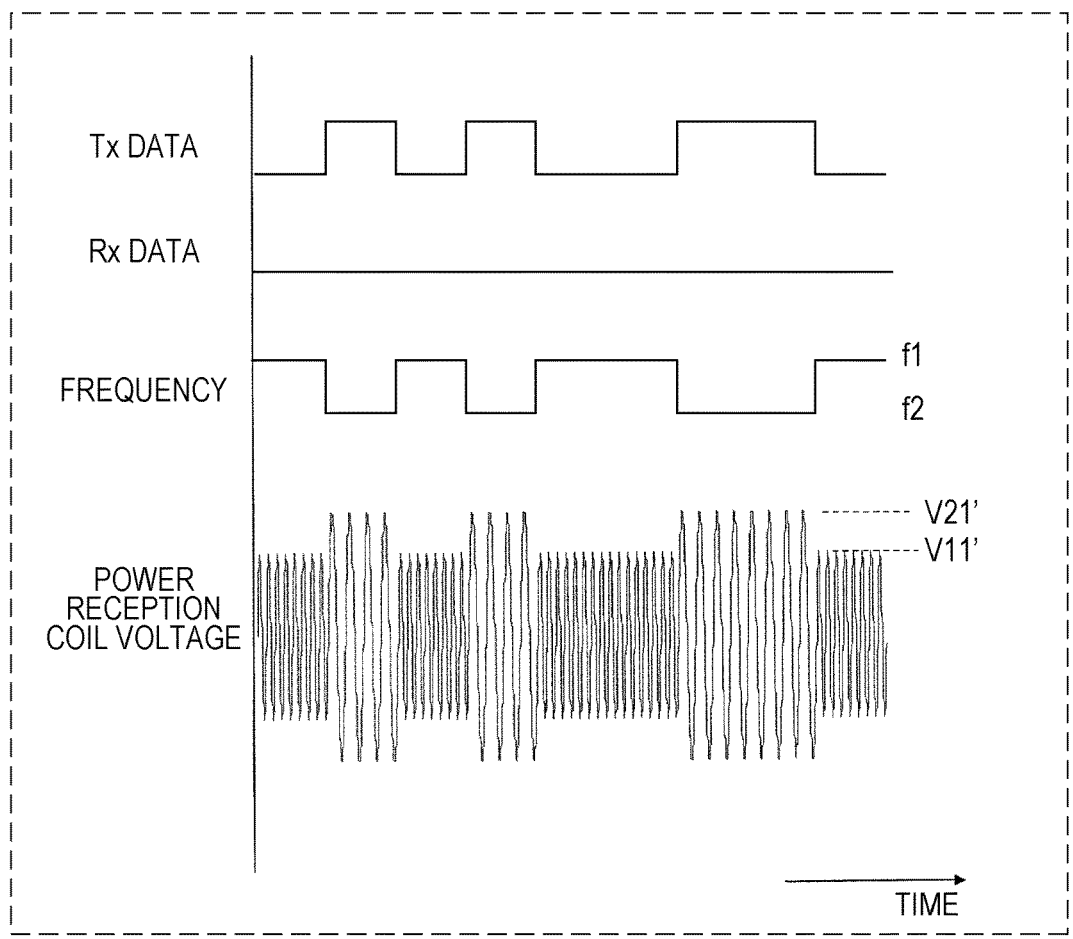
FIG. 13B is a diagram illustrating an example of temporal changes in Tx data, Rx data, frequency, and a power reception coil voltage at a time when the Tx data is transmitted in the existing art.

FIG. 13B illustrates an example of temporal changes in Tx data, Rx data, frequency, and the power reception coil voltage in this case.

When transmitting binary data (Tx data) to the power reception apparatus, the power transmission apparatus modulates the frequency of power to be transmitted (hereinafter also referred to as "transmission power frequency") between f1 and f2. In the illustrated example, f1>f2, where f1 corresponds to data of "0" and f2 corresponds to data of "1". As a result of the modulation of the frequency, the amplitude of the power transmission coil voltage and the power reception coil voltage varies. Since the power reception side does not transmit Rx data to the power transmission side, the load on the power reception side remains constant in this example. Here, the amplitude of the power transmission coil voltage with the frequency f1 is denoted as V11, and the amplitude of the power transmission coil voltage with the frequency f2 is denoted as V21. In addition, the power reception coil voltage corresponding to the voltage V11 is denoted as V11', and the power reception coil voltage corresponding to the voltage V21 is denoted as V21'. The power reception apparatus reads Tx data transmitted from the power transmission apparatus by detecting changes in the frequency of transmitted alternating current power. That is, if the detected frequency is f1, the power reception apparatus determines that Tx data is "0", and if the detected frequency is f2, the power reception apparatus determines that Tx data is "1".

Figure 13C:
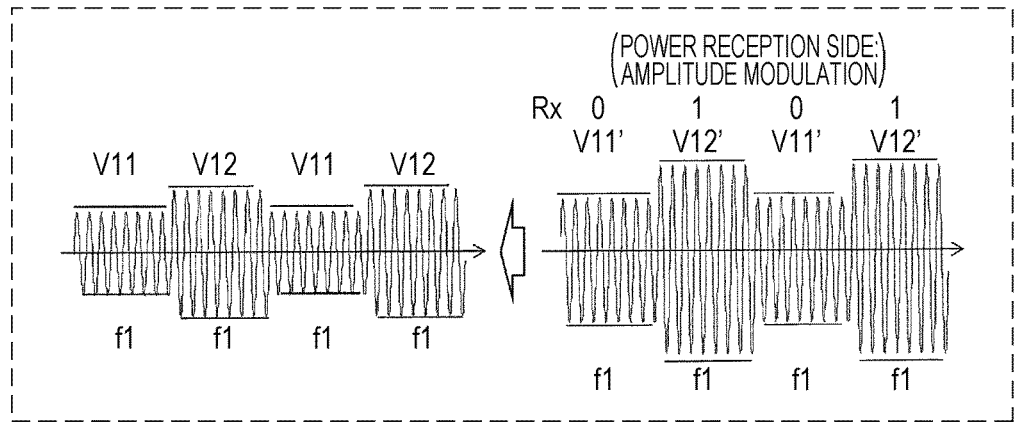
FIG. 13C is a first diagram illustrating changes in the amplitude of voltage at a time when the power reception side transmits Rx data to the power transmission side in the existing art.
Figure 13D:
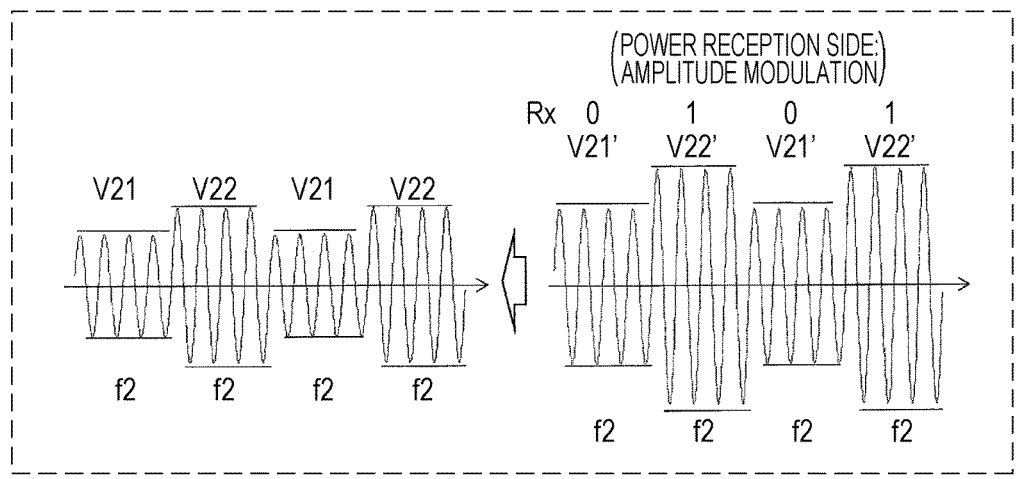
FIG. 13D is a second diagram illustrating changes in the amplitude of voltage at a time when the power reception side transmits Rx data to the power transmission side in the existing art.
Figure 13E:
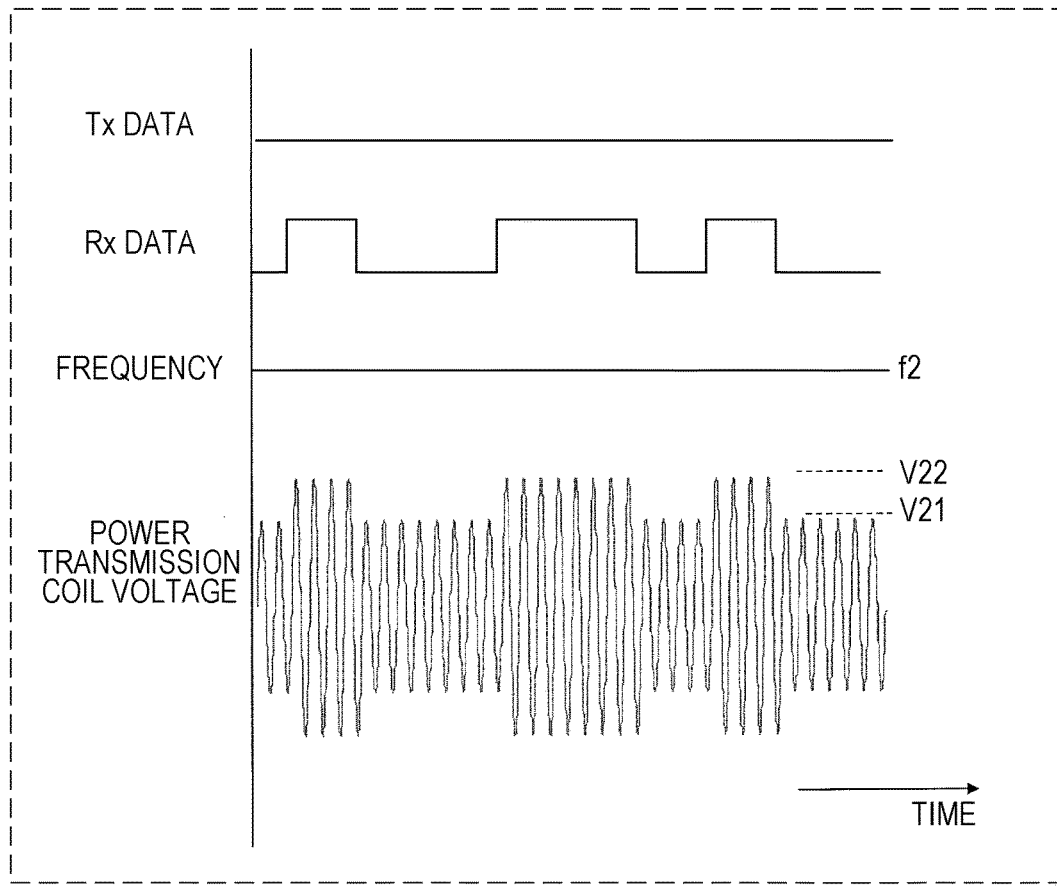
FIG. 13E is a diagram illustrating an example of temporal changes in Tx data, Rx data, the frequency, and a power transmission coil voltage at a time when the Rx data is transmitted in the existing art.

FIGS. 13C to 13E are diagrams illustrating transmission of Rx data from the power reception side to the power transmission side. FIG. 13C illustrates an example of a waveform (left side) of the power transmission coil voltage and a waveform (right side) of the power reception coil voltage at a time when the transmission power frequency is f1. FIG. 13D illustrates an example of a waveform (left side) of the power transmission coil voltage and a waveform (right side) of the power reception coil voltage at a time when the transmission power frequency is f2. FIG. 13E illustrates an example of temporal changes in Tx data, Rx data, frequency, and the power transmission coil voltage in this case. In the example illustrated in FIG. 13E, the frequency is f2, but the same holds when the frequency is f1.

When transmitting binary data (Rx data) to the power transmission apparatus, the power reception apparatus modulates the amplitude of the voltage of the power reception coil and the amplitude of the voltage of the power transmission coil by modulating the load in a circuit thereof.

As illustrated in FIG. 13C, when the frequency is constant at f1, the power reception apparatus varies the amplitude of the power reception coil voltage between V11' and V12' by modulating the load. The amplitude of the power transmission coil voltage accordingly varies between V11 and V12. The power transmission apparatus can read the Rx data by detecting the variation in the amplitude.

On the other hand, as illustrated in FIG. 13D, when the frequency is constant at f2, the power reception apparatus varies the amplitude of the power reception coil voltage between V21' and V22' by modulating the load. The amplitude of the power transmission coil voltage accordingly varies between V21 and V22. The power transmission apparatus can read the Rx data by detecting the variation in the amplitude.

As described above, in the existing art, the power transmission side transmits data to the power reception side through frequency modulation, and the power reception side transmits data to the power transmission side through amplitude modulation. It is difficult, however, to simultaneously perform these data transmission operations. This point will be described hereinafter.

Figure 13F:
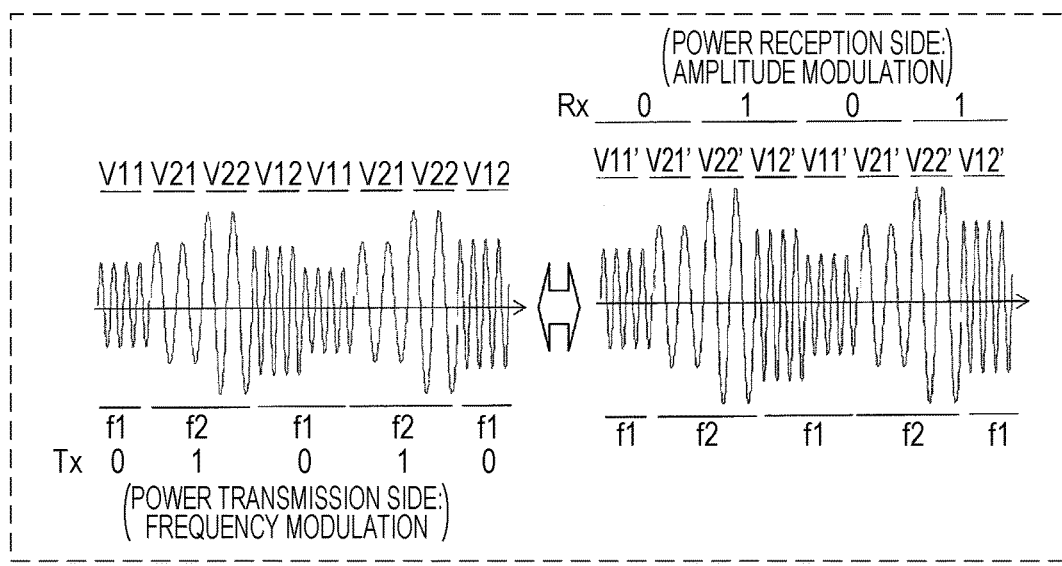
FIG. 13F is a first diagram illustrating a problem caused when the transmission of Tx data from the power transmission side to the power reception side and the transmission of Rx data from the power reception side to the power transmission side are simultaneously performed in the existing art.

FIG. 13F is a diagram illustrating a problem caused when the transmission of Tx data from the power transmission side to the power reception side and the transmission of Rx data from the power reception side to the power transmission side are simultaneously performed in the existing art. When the power transmission apparatus modulates the frequency between f1 and f2 in accordance with values of the Tx data, the amplitude of the power transmission coil voltage changes. At this time, if the power reception apparatus modulates the load to transmit the Rx data, the amplitude of the power transmission coil voltage further changes. When the transmission of Tx data and the transmission of Rx data intermingle with each other, the amplitude of the power transmission coil voltage varies between the four values V11, V12, V21, and V22. As a result, the Rx data might not be correctly demodulated on the basis of changes in the amplitude of the power transmission coil voltage.

Figure 13G:
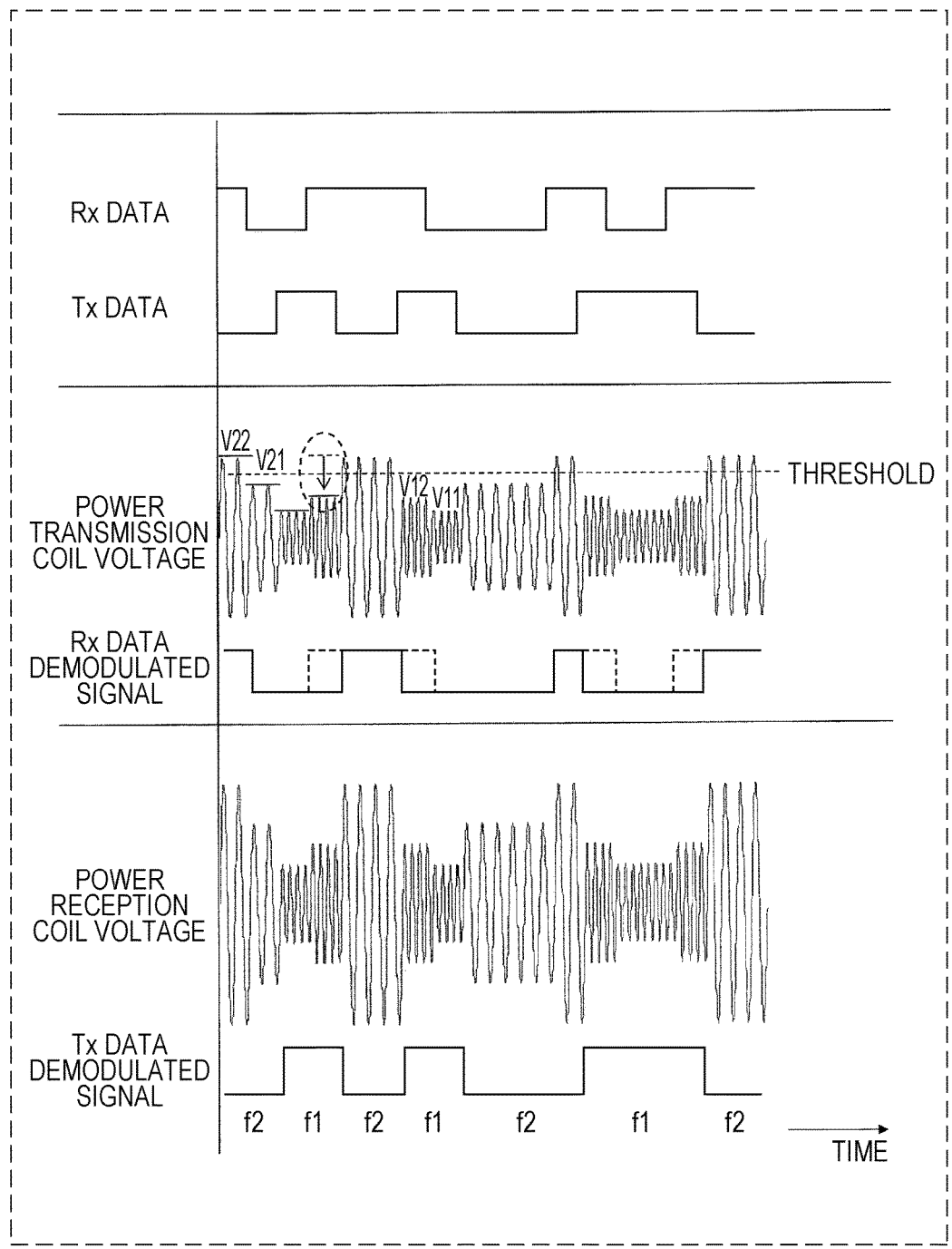
FIG. 13G is a second diagram illustrating the problem caused when the transmission of Tx data from the power transmission side to the power reception side and the transmission of Rx data from the power reception side to the power transmission side are simultaneously performed in the existing art.

FIG. 13G is a diagram illustrating an example in such a case. FIG. 13G illustrates an example of temporal changes in, from top to bottom, Rx data, Tx data, the power transmission coil voltage, a demodulated signal of the Rx data, the power reception coil voltage, and a demodulated signal of the Tx data.

The power transmission apparatus generates the demodulated signal of the Rx data by comparing the amplitude of the power transmission coil voltage with a certain threshold. The threshold is set as a value between the amplitudes V11 and V12 with the frequency f1 or as a value between the amplitudes V21 and V22 with the frequency f2. A value of the demodulated signal of the Rx data becomes "0" when the amplitude of the power transmission coil voltage is smaller than the threshold, and "1" when the amplitude of the voltage is equal to or larger than the threshold.

In the example illustrated in FIG. 13G, the threshold is set as a value between the amplitudes V21 and V22 with the frequency f2. The amplitudes V11 and V12 with the frequency f1 both fall below the threshold. In a period (inside an ellipse defined by a broken line in FIG. 13G) in which the amplitude is V12, therefore, the value of the demodulated signal of the Rx data is incorrectly determined as "0" (a solid line in the figure), not as a correct value "1" (a broken line in the figure). That is, it is difficult to correctly demodulate the Rx data. It is to be noted that the same problem arises when the threshold is set as a value between the amplitudes V11 and V12 with the frequency f1.

As described above, in the existing art, when the power transmission side and the power reception side simultaneously transmit data, the amplitude of the power transmission coil voltage takes four values, and it is difficult to correctly demodulate the data by detecting the amplitude of the power transmission coil voltage.

With the configurations in the existing art, therefore, when either the power transmission apparatus or the power reception apparatus is transmitting data, it is difficult for the other to transmit data. In such half-duplex communication, the power transmission apparatus and the power reception apparatus need to withhold transmission of data until transmission of data from the other is completed. There is, therefore, a problem in that it takes a long time to complete transmission of information. In an application (e.g., a motor, an actuator, or the like) in which a control signal needs to be transmitted to a device on a power reception side and a response signal needs to be obtained in real-time while power is being transmitted, in particular, a delay in data communication can pose a serious problem.

As a result of the above examination, the present inventors have arrived at the following aspects of the present disclosure.

A wireless power transmission system according to an aspect of the present disclosure is a wireless power transmission system including a power transmission apparatus including an inverter circuit that converts first direct current power supplied from a power supply into alternating current power and outputs the alternating current power, a power transmission antenna that wirelessly transmits the alternating current power output from the inverter circuit, and a power transmission control circuit that causes the inverter circuit to output the alternating current power and outputs the alternating current power as binary communication data by varying frequency of the alternating current power output from the inverter circuit between a first frequency and a second frequency, and a power reception apparatus including a power reception antenna that receives the alternating current power wirelessly transmitted from the power transmission antenna, and a power reception amplitude modulator that varies amplitude of voltage of the alternating current power input to the power transmission antenna between a first amplitude and a second amplitude, in which, when transmitting first binary communication data to be output from the power transmission antenna to the power reception antenna through electromagnetic coupling between the power transmission antenna and the power reception antenna, the power transmission control circuit selects the first frequency as one of the first binary communication data and the second frequency as another of the first binary communication data, in which, when transmitting second binary communication data from the power reception antenna to the power transmission antenna through the electromagnetic coupling, the power reception amplitude modulator selects the first amplitude as one of the second binary communication data and the second amplitude as another of the second binary communication data, and in which the power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

According to the above aspect, the power transmission control circuit performs, using the inverter circuit, the amplitude control for eliminating the difference between the third amplitude (V3) of the voltage of the alternating current power at a time when the frequency of the alternating current power is the first frequency and the fourth amplitude (V4) of the voltage of the alternating current power at a time when the frequency of the alternating current power is the second frequency.

Since almost no difference is left between the amplitude (V3) of the voltage of the alternating current power at a time when the frequency of the alternating current power is the first frequency (f1) and the amplitude (V4) of the voltage of the alternating current power at a time when the frequency of the alternating current power is the second frequency (f2) as a result of the amplitude control, an incorrect determination as in the existing art can be avoided. Even if either the power transmission apparatus or the power reception apparatus is transmitting data, therefore, the other can transmit data at the same time. It is to be noted that "eliminating a difference" does not mean that the difference becomes exactly zero (0), but there may be a slight difference.

A basic operation according to the embodiments of the present disclosure will be described hereinafter with reference to FIGS. 1A to 1C.

Figure 1A:
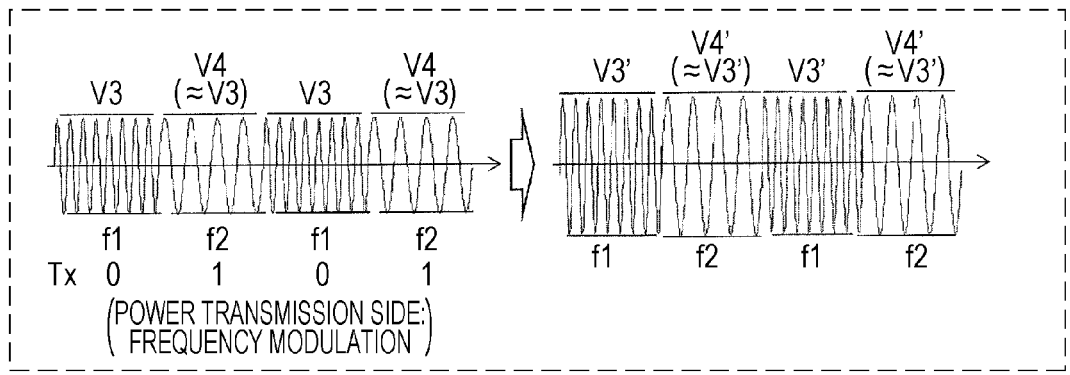
FIG. 1A is a diagram illustrating an example of changes in the amplitude of voltage at a time when a power transmission apparatus transmits Tx data according to embodiments of the present disclosure.

FIG. 1A is a diagram illustrating an example of changes in the amplitude of voltage at a time when Tx data is transmitted according to the embodiments of the present disclosure. A left-side diagram in FIG. 1A illustrates an example of a waveform of the voltage of alternating current power input to a power transmission antenna (the same as a voltage at both ends of the power transmission antenna; hereinafter also referred to as the "voltage of transmission power"), and a right-side diagram in FIG. 1A illustrates an example of a waveform of the voltage of alternating current power output from a power reception antenna (the same as a voltage at both ends of the power reception antenna; hereinafter also referred to as the "voltage of received power").

As illustrated in the figure, a power transmission apparatus performs amplitude control for eliminating a difference between the amplitude V3 of an alternating current voltage (hereinafter also referred to as a "voltage of transmission power") input to the power transmission when the frequency is the first frequency (f1) and the amplitude V4 of the voltage of transmission power at a time when the frequency is the second frequency (f2). The amplitude control is performed, for example, by controlling a plurality of switching elements included in an inverter circuit using a power transmission control circuit. More specifically, the amplitude control can be performed by adjusting, using a full-bridge inverter circuit, a phase difference (also referred to as an "amount of phase shift") between two pulse signals supplied to two switching elements that are simultaneously turned on (conductive state) among the plurality of switching elements. Alternatively, the amplitude control can be performed by adjusting a duty ratio of a pulse signal supplied to each switching element. If the latter, that is, the duty control, is performed, another inverter circuit, such as a half-bridge inverter circuit, may be used instead of a full-bridge inverter circuit.

As a result of the amplitude control, the amplitude of the voltage at both ends of the power transmission antenna hardly changes (that is, V4≈V3) even if the frequency is changed between f1 and f2. Similarly, the amplitude of the voltage at both ends of the power reception antenna hardly changes (V4'=V3'). Since the amplitude of the voltage of transmission power hardly changes even if the frequency is modulated, Rx data can be correctly demodulated on the basis of a comparison between the amplitude of the voltage of transmission power and a certain threshold even when the power reception apparatus transmits the Rx data while the power transmission apparatus is transmitting Tx data.

Figure 1B:
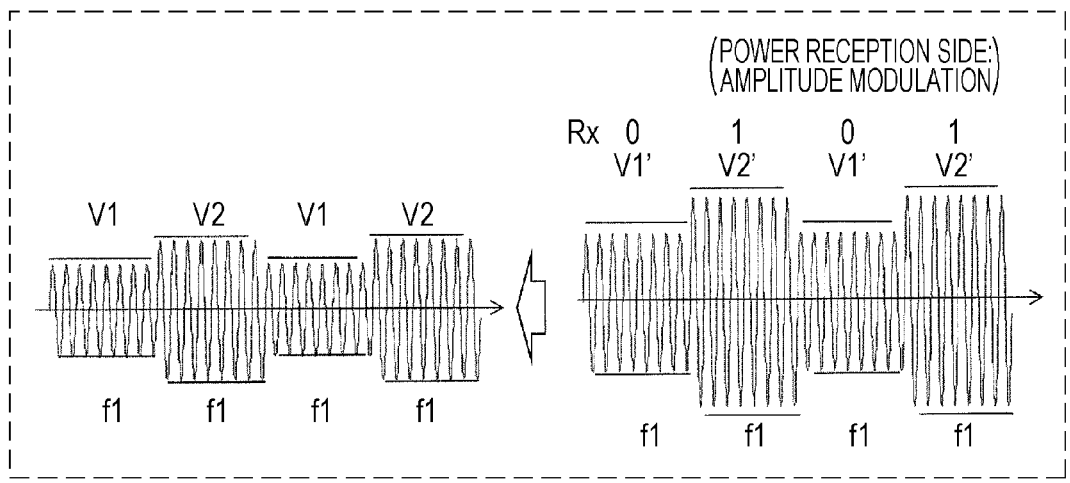
FIG. 1B is a diagram illustrating an example of transmission of Rx data performed by a power reception apparatus according to the embodiments of the present disclosure.

FIG. 1B is a diagram illustrating an example of transmission of Rx data performed by the power reception apparatus according to the embodiments of the present disclosure. In this example, the frequency is fixed at f1. If an amplitude modulator of the power reception apparatus changes the amplitude of the voltage of received power between V1' and V2' in accordance with values of the Rx data, the power transmission power detects the changes, and the amplitude of the voltage of transmission power changes between V1 and V2. The power transmission apparatus can demodulate the Rx data by detecting the changes. In the embodiments of the present disclosure, the power transmission apparatus performs the above amplitude control, and the amplitudes V1 and V2 when the frequency is f0 become substantially the same as when the frequency is f1. As a result, bidirectional communication becomes possible.

Figure 1C:
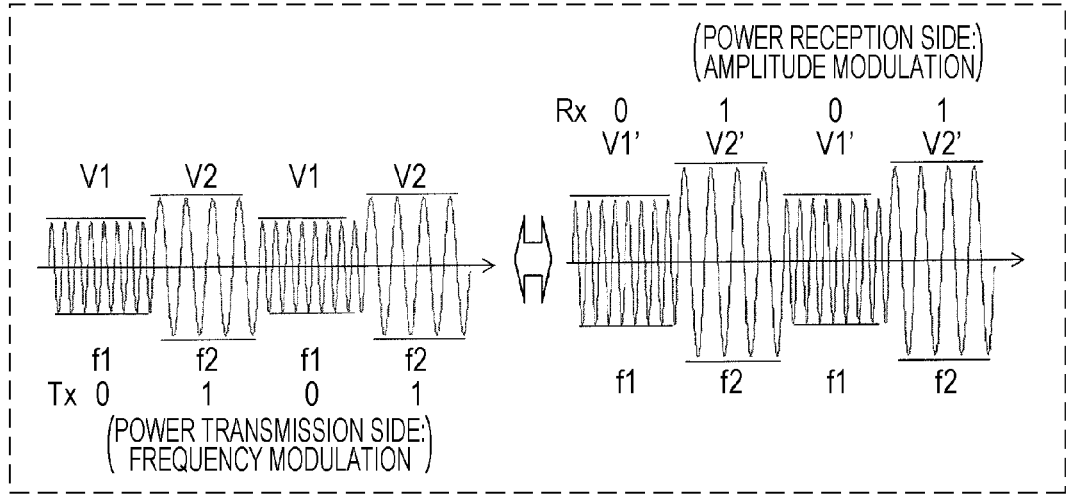
FIG. 1C is a diagram illustrating an example of a case where the power transmission apparatus performs frequency modulation and the power reception apparatus performs amplitude modulation at the same time.

FIG. 1C illustrates an example of a case where the power transmission apparatus performs frequency modulation and the power reception apparatus performs amplitude modulation at the same time. In this example, when the power transmission apparatus selects the first frequency f1, the power reception apparatus selects the first amplitude V1, and when the power transmission apparatus selects the second frequency f2, the power reception apparatus selects the second amplitude V2. As a result of the amplitude control performed by the power transmission apparatus, the amplitude of transmission power does not change even if the frequency is changed between f1 and f2. A demodulated signal of Rx data, therefore, can be generated using the same threshold regardless of whether the frequency is set to f1 or f2. Since Rx data can be correctly demodulated while Tx data is being transmitted, transmission of Tx data and transmission of Rx data can be simultaneously performed.

More specific embodiments of the present disclosure will be described hereinafter. In the following description, the same or corresponding components are given the same reference numerals.

First Embodiment

Figure 2:
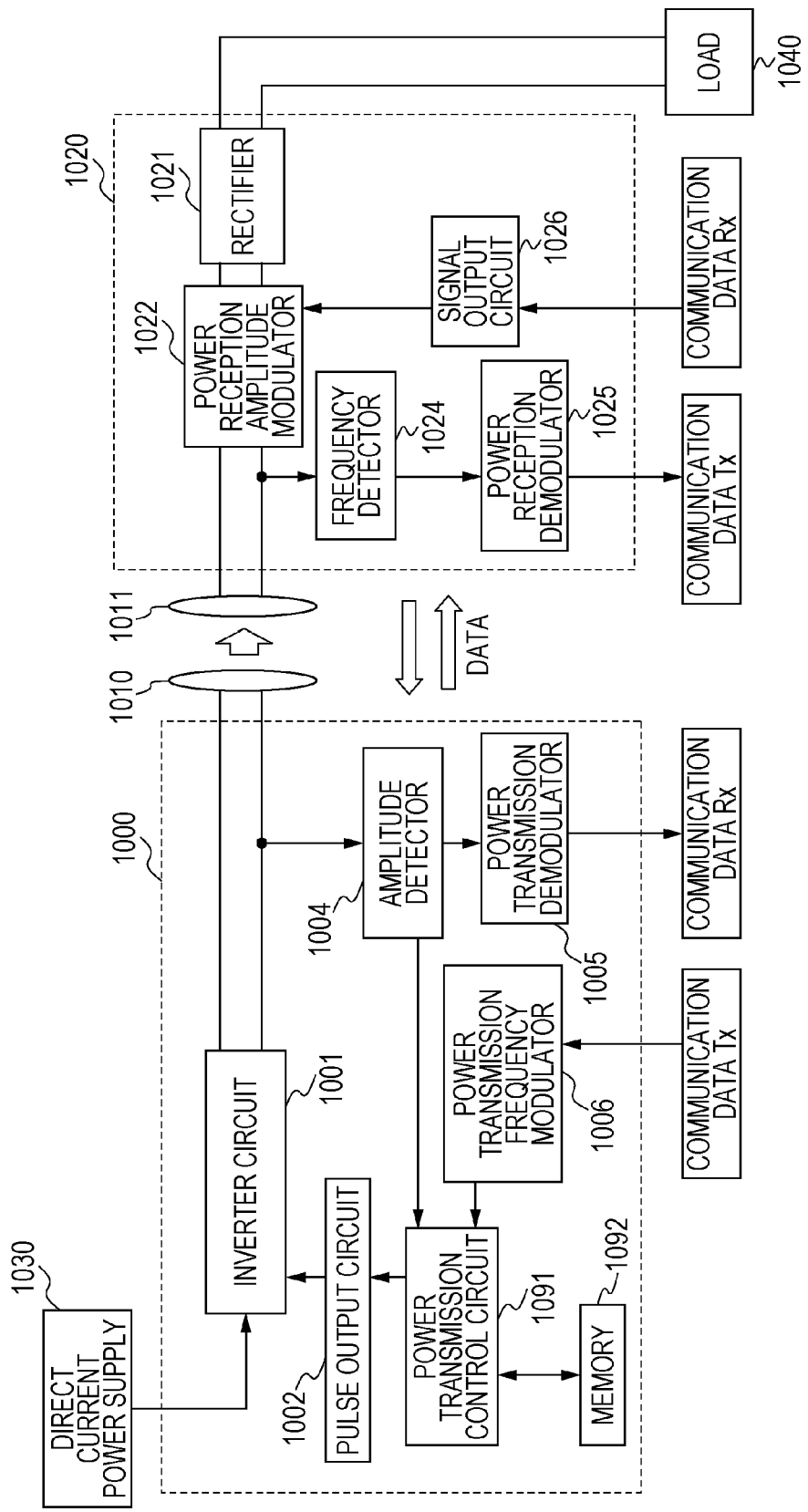
FIG. 2 is a diagram illustrating the configuration of a wireless power transmission system according to a first embodiment.

FIG. 2 is a block diagram illustrating an example of the configuration of a wireless power transmission system according to a first embodiment of the present disclosure. The wireless power transmission system according to the first embodiment includes a power transmission apparatus and a power reception apparatus. The power transmission apparatus includes a power transmission circuit 1000 that converts direct current (DC) energy (that is, DC power) input from an external DC power supply 1030 into alternating current energy (that is, alternating current power) and that outputs the alternating current power and a power transmission antenna 1010 that transmits the alternating current power output from the power transmission circuit 1000. The power reception apparatus includes a power reception antenna 1011 that receives the alternating current power transmitted from the power transmission antenna 1010, a power reception circuit 1020 that converts the alternating current power received by the power reception antenna 1011 into DC power and that outputs the DC power, and a load 1040 that operates on the DC power output from the power reception circuit 1020.

The power transmission antenna 1010 and the power reception antenna 1011 can each be configured, for example, by a resonant circuit including a coil and a capacitor. Power is wirelessly transmitted through inductive coupling (that is, magnetic field coupling) between the coils. Each antenna may have a configuration with which power is wirelessly transmitted through electric field coupling instead of magnetic field coupling. In this case, each antenna can include two electrodes for transmitting or receiving power and a resonant circuit including an inductor and a capacitor. A power transmission antenna and a power reception antenna employing electric field coupling can be suitably used, for example, when power is wirelessly transmitted to a mobile device such as a carrier robot in a factory.

The power reception apparatus can be, for example, the above-mentioned carrier robot, a tip of a robot arm, a rotation unit of a monitoring camera, or the like. The power transmission apparatus is an apparatus that wirelessly supplies power to the power reception apparatus and can be mounted, for example, at a root of the robot arm or a fixing unit of the monitoring camera. The load 1040 can be, for example, an image capture device, such as a charge-coupled device (CCD) camera, mounted on the rotation unit of the monitoring camera or a device including a motor, such as an actuator mounted on the tip of the robot arm.

The power reception circuit 1020 includes a rectifier circuit (rectifier) 1021 that converts alternating current power output from the power reception antenna 1011 into DC power and that supplies the DC power to the load 1040, a power reception amplitude modulation circuit (power reception modulator) 1022 that modulates the amplitude of voltage in the power reception circuit and voltage in the power transmission circuit through load modulation, a frequency detection circuit (frequency detector) 1024 that detects the frequency of the transmitted alternating current power, a demodulation circuit (power reception demodulator) 1025 that demodulates a signal of Tx data transmitted from the power transmission circuit 1000 on the basis of the detected frequency, and a signal output circuit 1026 that outputs a control signal to the power reception amplitude modulator 1022 in accordance with Rx data to be transmitted to the power transmission apparatus.

The power transmission circuit 1000 includes an inverter circuit 1001 that converts DC power input from the DC power supply 1030 into alternating current power using a plurality of switching elements, an amplitude detection circuit (amplitude detector) 1004 that detects the amplitude of an alternating current voltage input to the power transmission antenna 1010, a demodulation circuit (power transmission demodulator) 1005 that demodulates an Rx signal transmitted from the power reception circuit 1020 on the basis of the detected amplitude, a power transmission frequency modulator 1006 that determines a frequency to be used in accordance with Tx data to be transmitted to the power reception apparatus, a pulse output circuit 1002 that outputs pulse signals for driving the plurality of switching elements included in the inverter circuit 1001, and a power transmission control circuit 1091 that determines power transmission parameters on the basis of the frequency determined by the power transmission frequency modulator 1006 and that controls the pulse output circuit 1002. The power transmission parameters are parameters for controlling timings at which the plurality of switching elements included in the inverter circuit 1001 turn on (conductive state) and off (non-conductive state). The power transmission parameters can include the frequency of a pulse signal input to each switching element, a phase difference between two pulse signals input to two switching elements that simultaneously turn on among the plurality of switching elements, a duty ratio of the pulse signal input to each switching element, and the like.

With this configuration, the wireless power transmission system according to the present embodiment can communicate data bidirectionally through the power transmission antenna 1010 and the power reception antenna 1011 while transmitting power. A supposed type of communication data can be, for example, a control signal (an instruction signal regarding a tilt, a pan, a zoom, and the like) for a monitoring camera as a signal from a power transmission side to a power reception side. As a signal from the power reception side to the power transmission side, a supposed type of communication data can be a response signal to an instruction or image (video) data. In the case of a robot arm, a supposed type of communication data can be a control signal for a motor that moves a robot or a response signal to it.

The components will be described in more detail hereinafter.

The power transmission control circuit 1091 performs control relating to transmission of power. For example, the power transmission control circuit 1091 determines the power transmission parameters including the frequency of a gate pulse input to the inverter circuit on the basis of information from the power transmission frequency modulator 1006 and controls the pulse on the basis of the parameters. The power transmission control circuit 1091 can be, for example, an integrated circuit including a processor such as a microcontroller (MCU). The power transmission control circuit 1091 may be integrated with another component such as the pulse output circuit 1002 or the power transmission frequency modulator 1006.

Figure 3A:
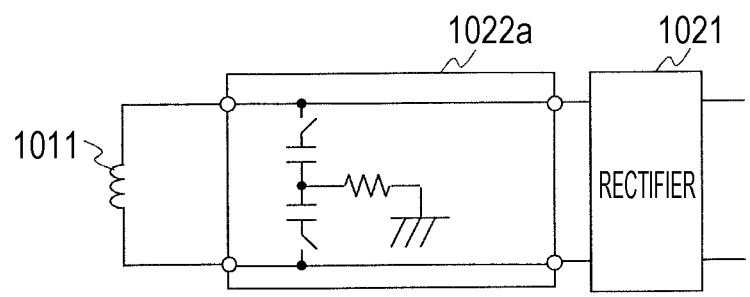
FIG. 3A is a diagram illustrating an example of the configuration of an amplitude modulator of a power reception circuit.

FIG. 3A is a diagram illustrating an example of the configuration of a modulator in the power reception circuit 1020. An illustrated modulator 1022a is a load modulation circuit connected between the power reception antenna 1011 and the rectifier 1021. The modulator 1022a includes two switches and two capacitors connected parallel to the power reception antenna 1011 and a resistor connected between a point between the two capacitors and the ground. The modulator 1022a performs load modulation by controlling open/close states of the two switches on the basis of signals from the signal output circuit 1026. More specifically, the modulator 1022a changes an overall load of the power reception apparatus by switching on/off states of the two switches and opening or closing a route of current different from a route to the load 1040. As a result, information (Rx data) can be transmitted to the power transmission apparatus.

Figure 3B:
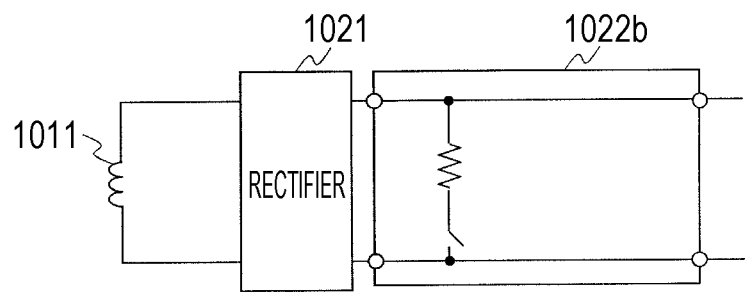
FIG. 3B is a diagram illustrating another example of the configuration of the amplitude modulator of the power reception circuit.

Although the power reception amplitude modulator 1022 is arranged in a previous stage of the rectifier 1021 in the example of the configuration illustrated in FIGS. 2 and 3A, the power reception amplitude modulator 1022 may be arranged in a subsequent stage of the rectifier 1021, instead. FIG. 3B is a diagram illustrating an example of a modulator 1022b arranged in such a manner. The modulator 1022b is connected between the rectifier 1021 and the load 1040. The modulator 1022b includes a resistor and a switch connected parallel to the rectifier 1021. The modulator 1022b can change the overall load of the power reception apparatus by switching an on/off state of the switch on the basis of a signal from the signal output circuit 1026.

Figure 4:
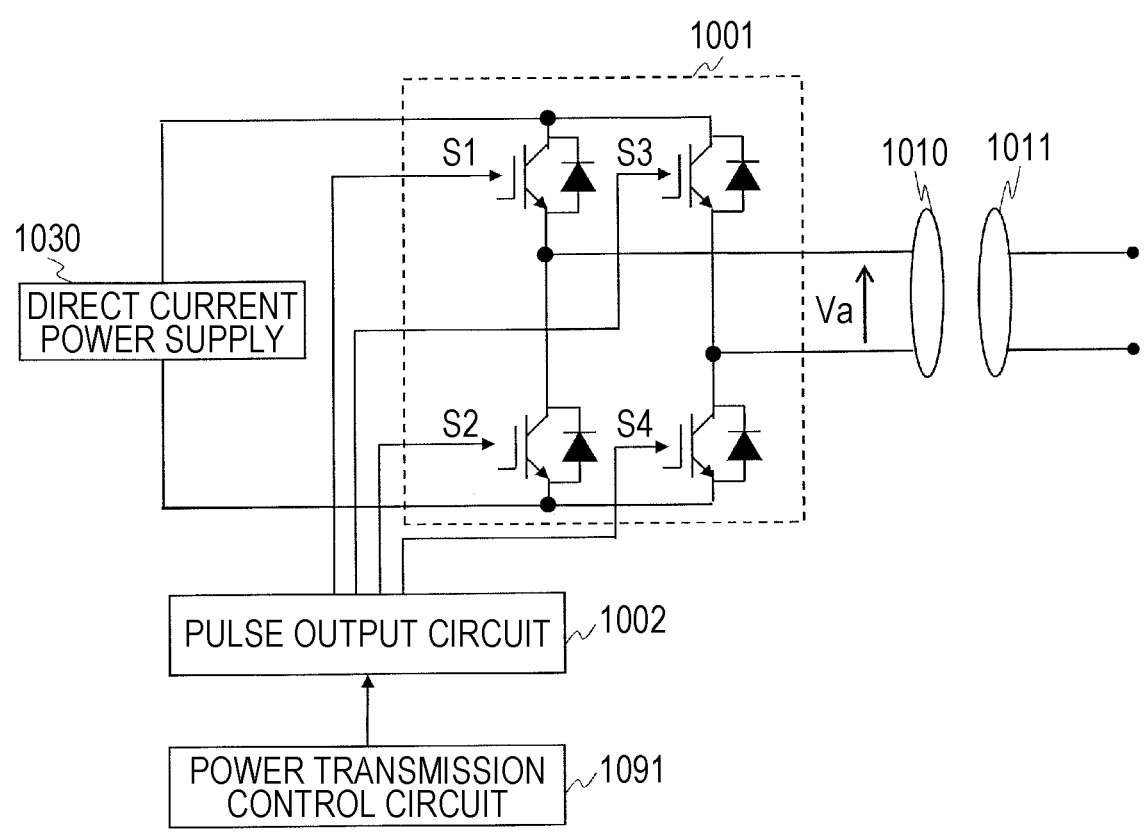
FIG. 4 is a diagram illustrating an example of an inverter circuit.

FIG. 4 is a diagram illustrating an example of the configuration of the inverter circuit 1001. The inverter circuit 1001 includes a plurality of switching elements S1 to S4 that change conductive/non-conductive states in accordance with pulse signals supplied from the pulse output circuit 1002. By changing the conductive/non-conductive state of each switching element, input DC power can be converted into alternating current power. In the example illustrated in FIG. 4, a full-bridge inverter circuit including the four switching elements S1 to S4 is used. In the illustrated example, each switching element is an insulated-gate bipolar transistor (IGBT), but a switching element of another type, such as a metal-oxide-semiconductor field-effect transistor (MOSFET), may be used, instead.

In the example illustrated in FIG. 4, among the four switching elements S1 to S4, the switching elements S1 and S4 (first switching element pair) output, when conductive, a voltage having the same polarity as a DC voltage supplied from the DC power supply 1030. On the other hand, the switching elements S2 and S3 (second switching element pair) output, when conductive, a voltage having an opposite polarity to the DC voltage supplied from the DC power supply 1030. The pulse output circuit 1002 supplies pulse signals to gates of the switching elements S1 to S4 in accordance with an instruction from the power transmission control circuit 1091. At this time, the pulse output circuit 1002 performs amplitude control by adjusting a phase difference (also referred to as the "amount of phase shift") between the two pulse signals supplied to the first switching element pair (S1 and S4) and a phase difference between the two pulse signals supplied to the second switching element pair (S2 and S3).

Figure 5A:
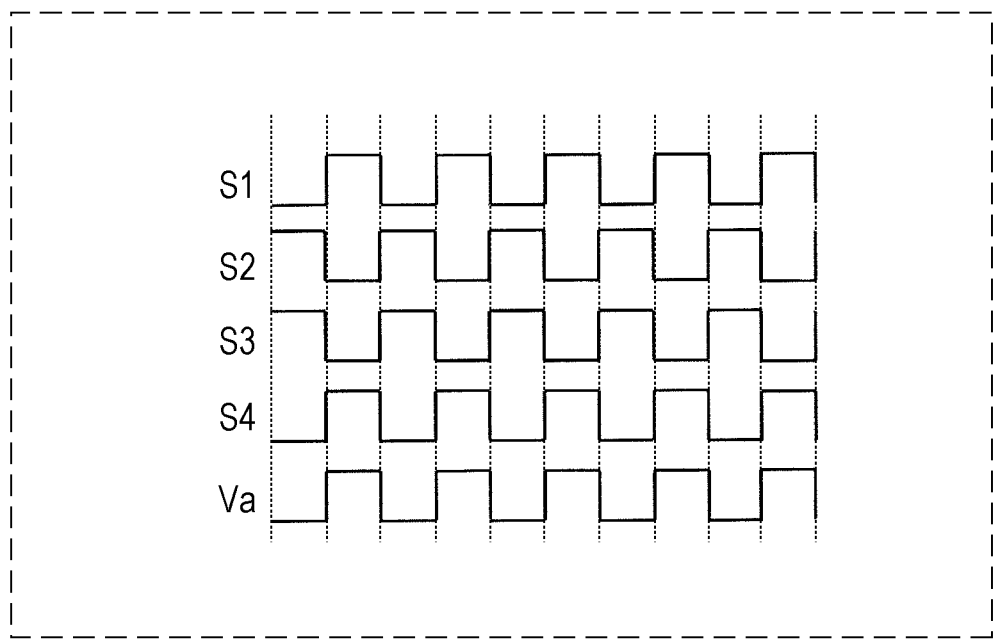
FIG. 5A is a diagram illustrating an example of waveforms of pulse signals input to switching elements and an output voltage Va at a time when the amount of phase shift is 0 degree.
Figure 5B:
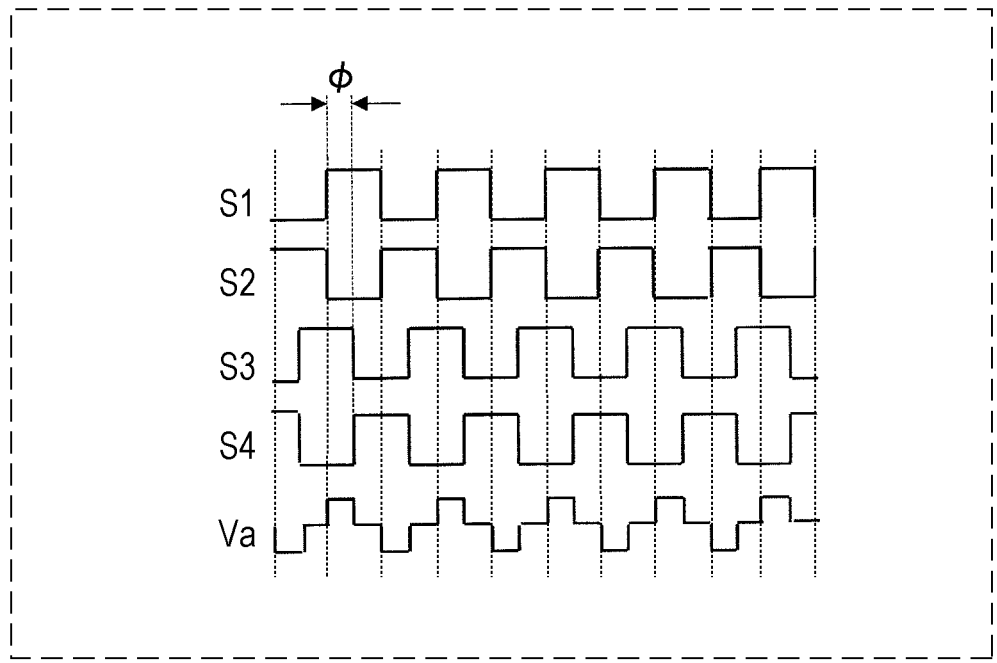
FIG. 5B is a diagram illustrating an example of the waveforms of the pulse signals input to the switching elements and the output voltage Va at a time when the amount of phase shift is 90 degrees.

FIGS. 5A and 5B are diagrams illustrating the amplitude control based on the phase differences between the pulse signals. FIG. 5A schematically illustrates temporal changes in the four pulse signals and a voltage Va output from the inverter circuit 1001 at a time when an amount φ of phase shift between the two pulse signals supplied to the switching elements S1 and S4 and an amount φ of phase shift between the two pulse signals supplied to the switching elements S2 and S3 are 0 degree. FIG. 5B schematically illustrates temporal changes in the pulse signals and the voltage Va at a time when the amount φ of phase shift is 90 degrees. The amount φ of phase shift is adjusted by temporally shifting rising and falling timings of the pulse signals input to the switching elements S3 and S4 relative to rising and falling timings of the pulse signals input to the switching elements S1 and S2. If the amount φ of phase shift is changed, an output time ratio (a ratio of a period in which the voltage Va is not zero to one cycle) changes. The output time ratio of the voltage Va becomes higher as the amount φ of phase shift becomes closer to 0 degree, and becomes lower as the amount φ of phase shift becomes closer to 180 degrees. The voltage Va output from the inverter circuit 1001 can be converted into a sine-wave voltage by a smoothing circuit that is not illustrated and supplied to the power transmission antenna 1010. The amplitude of the sine-wave voltage changes in accordance with the output time ratio. By changing the amount φ of phase shift, therefore, the amplitude of the alternating current voltage input to the power transmission antenna 1010 can be changed.

Next, the amplitude control according to the present embodiment will be described with reference to FIGS. 6A to 6C.

Figure 6A:
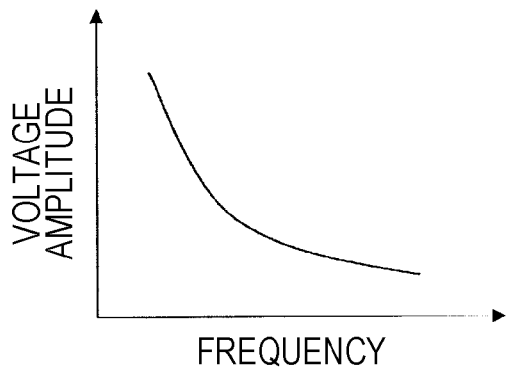
FIG. 6A is a diagram schematically illustrating a change in alternating current voltage (voltage of transmission power) input to a power transmission antenna at a time when frequency is changed.

FIG. 6A is a diagram schematically illustrating a change in the alternating current voltage (voltage of transmission power) input to the power transmission antenna 1010 at a time when frequency is changed. In the wireless power transmission system according to the present embodiment, the amplitude of the voltage of transmission power becomes smaller as the frequency becomes higher as illustrated in FIG. 6A. By changing the frequency in order to transmit Tx data, therefore, the amplitude of the voltage of transmission power varies.

Figure 6B:
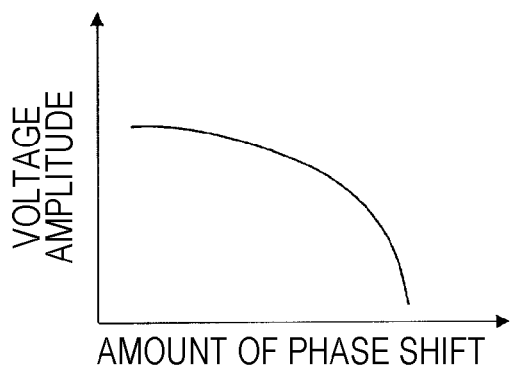
FIG. 6B is a diagram schematically illustrating a change in the amplitude of the voltage of transmission power at a time when an amount of phase shift between two pulse signals supplied to two switching elements.

FIG. 6B is a diagram schematically illustrating a change in the amplitude of the voltage of transmission power at a time when the amount $\phi$ of phase shift between two pulse signals supplied to two switching elements is changed. If the amount $\phi$ of phase shift is changed, the output time ratio of the voltage Va output from the inverter circuit 1001 changes due to the above-described principle. The amplitude of the alternating current voltage (e.g., sine-wave voltage) input to the power transmission antenna 1010 accordingly changes. The amplitude of the voltage of transmission power becomes largest when the amount of phase shift is 0 degree, and becomes smaller as the amount of phase shift becomes closer to 180 degrees.

That is, when a relationship between the amplitude of the voltage of transmission power, the frequency, and the amount of phase shift is as illustrated in FIGS. 6A and 6B, control can be performed in such a way as to keep the voltage of transmission power constant by appropriately selecting the two parameters, namely the frequency and the amount of phase shift.

Figure 6C:
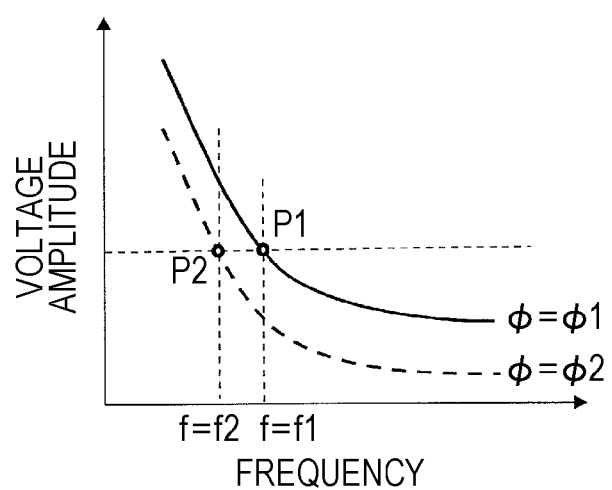
FIG. 6C is a diagram illustrating the amplitude of the voltage of transmission power kept constant through amplitude control according to the present embodiment.

FIG. 6C is a diagram illustrating the amplitude of the voltage of transmission power kept constant through the amplitude control according to the present embodiment. FIG. 6C illustrates a curve (solid line) representing a relationship between the amplitude of the voltage of transmission power and the frequency at a time when the amount $\phi$ of phase shift is $\phi1$ and a curve (broken line) representing a relationship between the amplitude of the voltage of transmission power and the frequency at a time when the amount $\phi$ of phase shift is $\phi2$ ($>\phi1$). The amplitude of the voltage of transmission power when the frequency is f1 and the amount of phase shift is $\phi1$ (a point P1 in FIG. 6C) and the amplitude of the voltage of transmission power when the frequency f is f2 ($<$f1) and the amount $\phi$ of phase shift is $\phi2$ (a point P2 in FIG. 6C) are the same. That is, when the frequency is modulated between f1 and f2, the amplitude of the voltage of transmission power can be kept constant by modulating the amount of phase shift between $\phi1$ and $\phi2$.

The power transmission control circuit 1091 according to the present embodiment, therefore, varies the frequency between f1 and f2 and the amount of phase shift between $\phi1$ and $\phi2$ when transmitting data (Tx data) to the power reception apparatus. Since the amplitude of the voltage of transmission power corresponding to the frequency f1 and the amount $\phi1$ of phase shift is the same as the amplitude of the voltage of transmission power corresponding to the frequency f2 and the amount $\phi2$ of phase shift, transmission of Tx data and reception of Rx data can be simultaneously performed unlike in the existing art.

The transmission of Tx data, the transmission of Rx data, and the operation for simultaneously transmitting Tx data and Rx data according to the present embodiment will be described hereinafter with reference to FIGS. 7A to 7C.

Figure 7A:
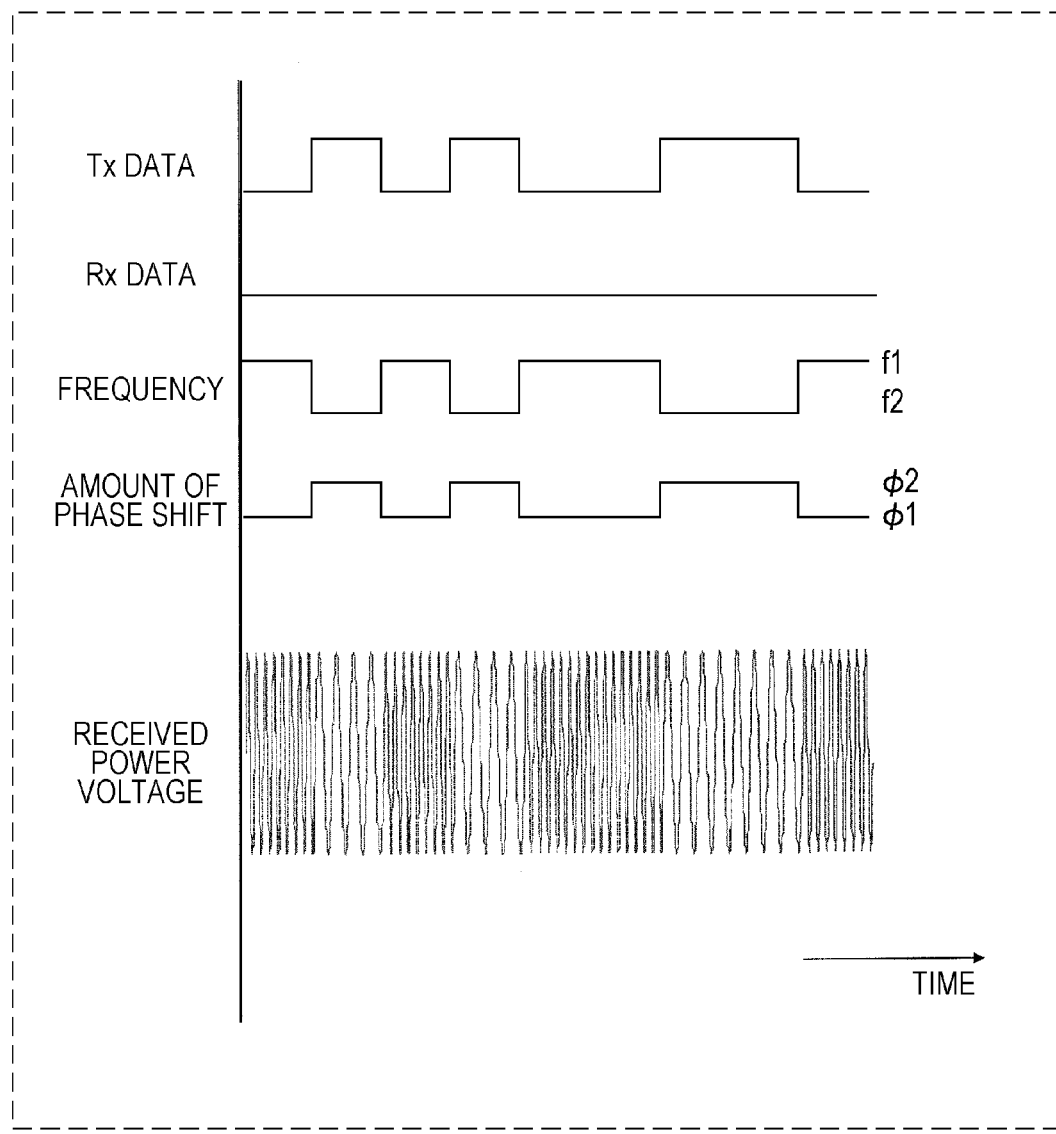
FIG. 7A is a diagram illustrating an example of temporal changes in Tx data, Rx data, the frequency, the amount of phase shift, and the voltage of received power at a time when a power transmission apparatus is transmitting the Tx data to a power reception apparatus.

FIG. 7A is a diagram illustrating an example of temporal changes in Tx data, Rx data, the frequency, the amount of phase shift, and the voltage of received power at a time when the power transmission apparatus is transmitting the Tx data to the power reception apparatus. When only the power transmission apparatus is transmitting the Tx data to the power reception apparatus, the Rx data is in a no-signal state. The power transmission control circuit 1091 changes the frequency in accordance with binary values of the Tx data transmitted from the power transmission apparatus to the power reception apparatus. At this time, correction based on the amount of phase shift is also performed. More specifically, when the Tx data is "0", the power transmission control circuit 1091 sets the frequency to f1 and the amount of phase shift to $\phi1$. When the Tx data is "1", on the other hand, the power transmission control circuit 1091 sets the frequency to f2 and the amount of phase shift to $\phi2$. As a result of this control operation, the amplitude of the voltage of received power is kept constant regardless of the signal value of the Tx data. The frequency detector 1024 and the power reception demodulator 1025 of the power reception apparatus can detect the frequency of transmitted high-frequency power and demodulate the signal of the Tx data.

Figure 7B:
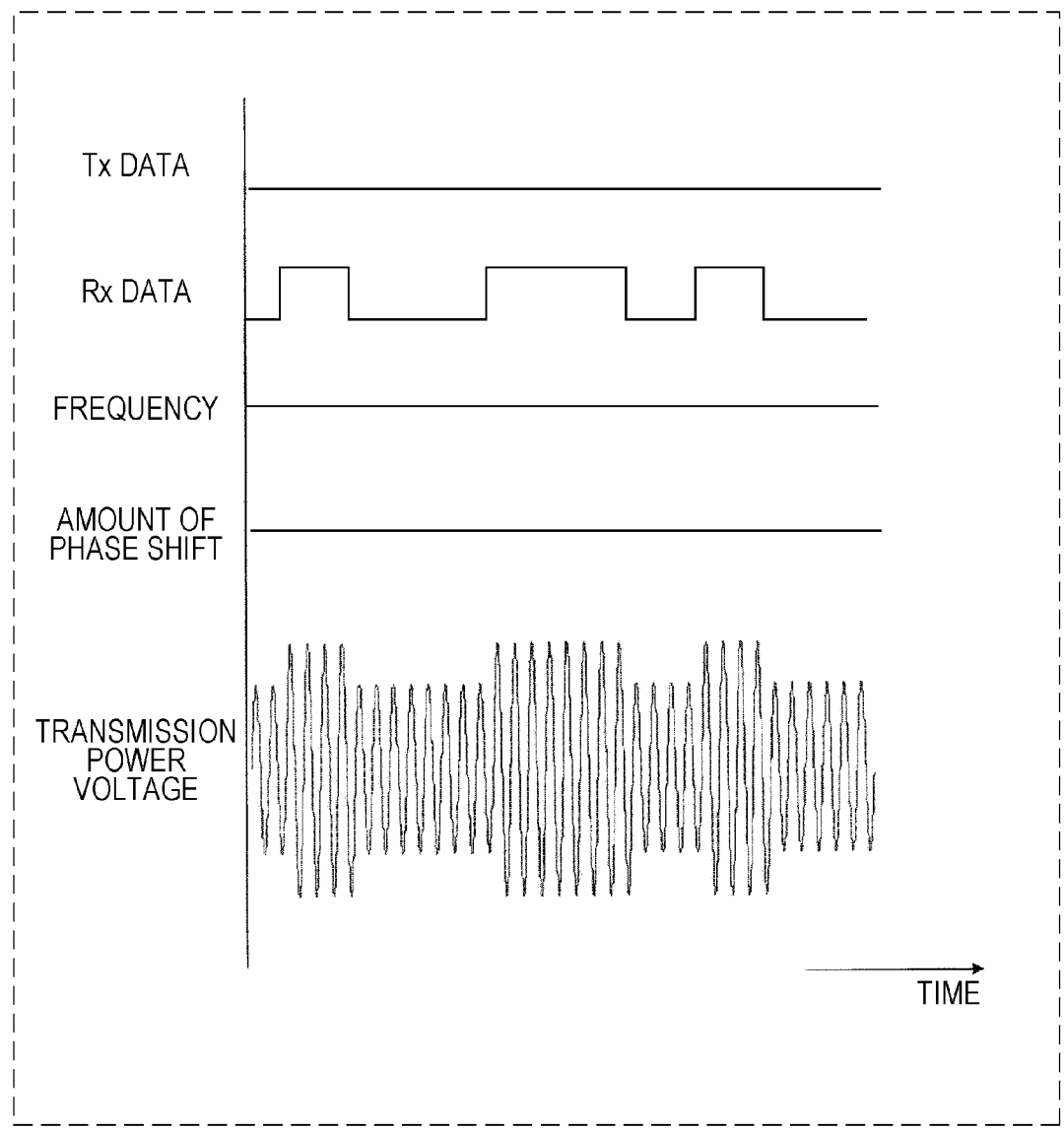
FIG. 7B is a diagram illustrating an example of temporal changes in Tx data, Rx data, the frequency, the amount of phase shift, and the voltage of transmission power at a time when the power reception apparatus is transmitting the Rx data to the power transmission apparatus.

FIG. 7B is a diagram illustrating an example of temporal changes in Tx data, Rx data, the frequency, the amount of phase shift, and the voltage of transmission power at a time when the power reception apparatus is transmitting the Rx data to the power transmission apparatus. When only the power reception apparatus is transmitting the Rx data to the power transmission data, the Tx data is in a no-signal state. The signal output circuit 1026 modulates the load in the power reception amplitude modulator 1022 and the amplitude of the voltage input to the power transmission antenna in accordance with binary values of the Rx data transmitted from the power reception apparatus to the power transmission apparatus. The amplitude detector 1004 and the power transmission demodulator 1005 of the power transmission apparatus can demodulate the Rx data by detecting this change in the amplitude.

Figure 7C:
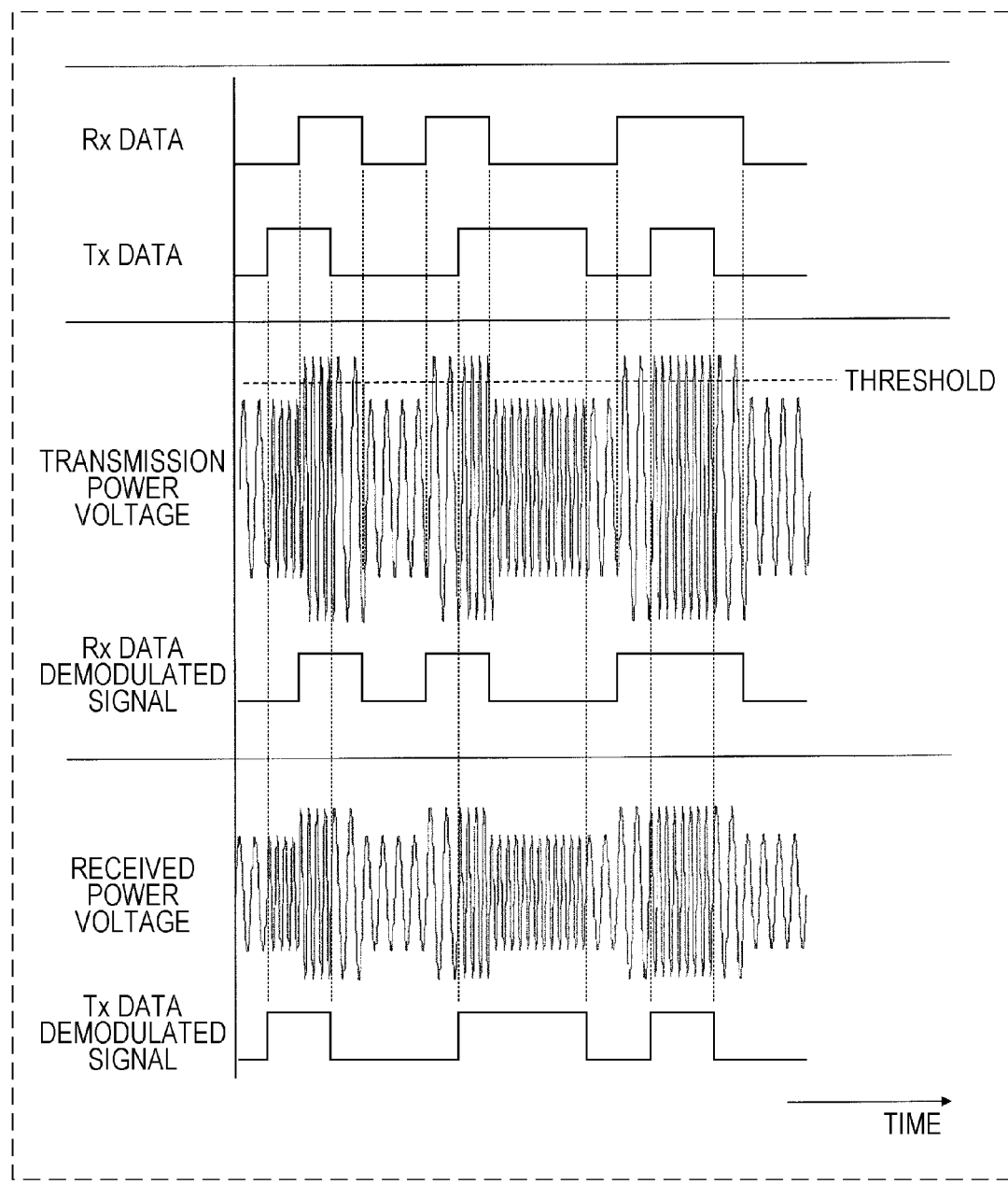
FIG. 7C is a diagram illustrating an example of various waveforms at a time when a timing at which the power transmission apparatus transmits Tx data and a timing at which the power reception apparatus transmits Rx data overlap.

FIG. 7C is a diagram illustrating an example of various waveforms at a time when a timing at which the power transmission apparatus transmits Tx data and a timing at which the power reception apparatus transmits Rx data overlap. FIG. 7C illustrates an example of temporal changes in, from top to bottom, the Rx data, the Tx data, the voltage of transmission power, a demodulated signal of the Rx data, the voltage of received power, and a demodulated signal of the Tx data. Even when the transmission of the Tx data and the Rx data overlaps, the amplitude detector 1004 and the power transmission demodulator 1005 of the power transmission apparatus can demodulate the Rx data from the power reception apparatus on the basis of a comparison between the amplitude of the voltage of transmission power and a certain threshold. In addition, the frequency detector 1024 and the power reception demodulator 1025 of the power reception apparatus can demodulate the Tx data from the power transmission apparatus by detecting the changes in the frequency of the voltage of received power.

As described above, unlike in the existing art, since the amplitude of voltage is kept constant even while Tx data is being transmitted in the present embodiment, interference can be prevented even if Rx data is simultaneously transmitted from the power reception apparatus. According to the present embodiment, even if the power transmission apparatus and the power reception apparatus simultaneously transmit data, signals from these apparatuses can be detected without a loss. As a result, the power transmission apparatus and the power reception apparatus need not withhold transmission of data until transmission of data from the other apparatus is completed, and a communication capacity improves.

Next, the amplitude control performed by the power transmission apparatus according to the present embodiment will be described more specifically.

The amount of change in the amplitude caused when the frequency is changed might differ depending on a value of the load connected to the power reception circuit 1020. In this case, the power transmission circuit 1000 may monitor the voltage of transmission power while transmitting Tx data, and perform feedback control such that the amplitude of the voltage after the frequency is changed becomes the same as the amplitude of the voltage before the frequency is changed. As a result, even if the value of the load varies, the amplitude of the voltage of transmission power can be kept at a constant value. In addition, in order to accommodate a plurality of types of loads, a table specifying correspondences between the frequency and the amount of phase shift in accordance with the load may be prepared and stored in a memory 1092.

Figure 8:
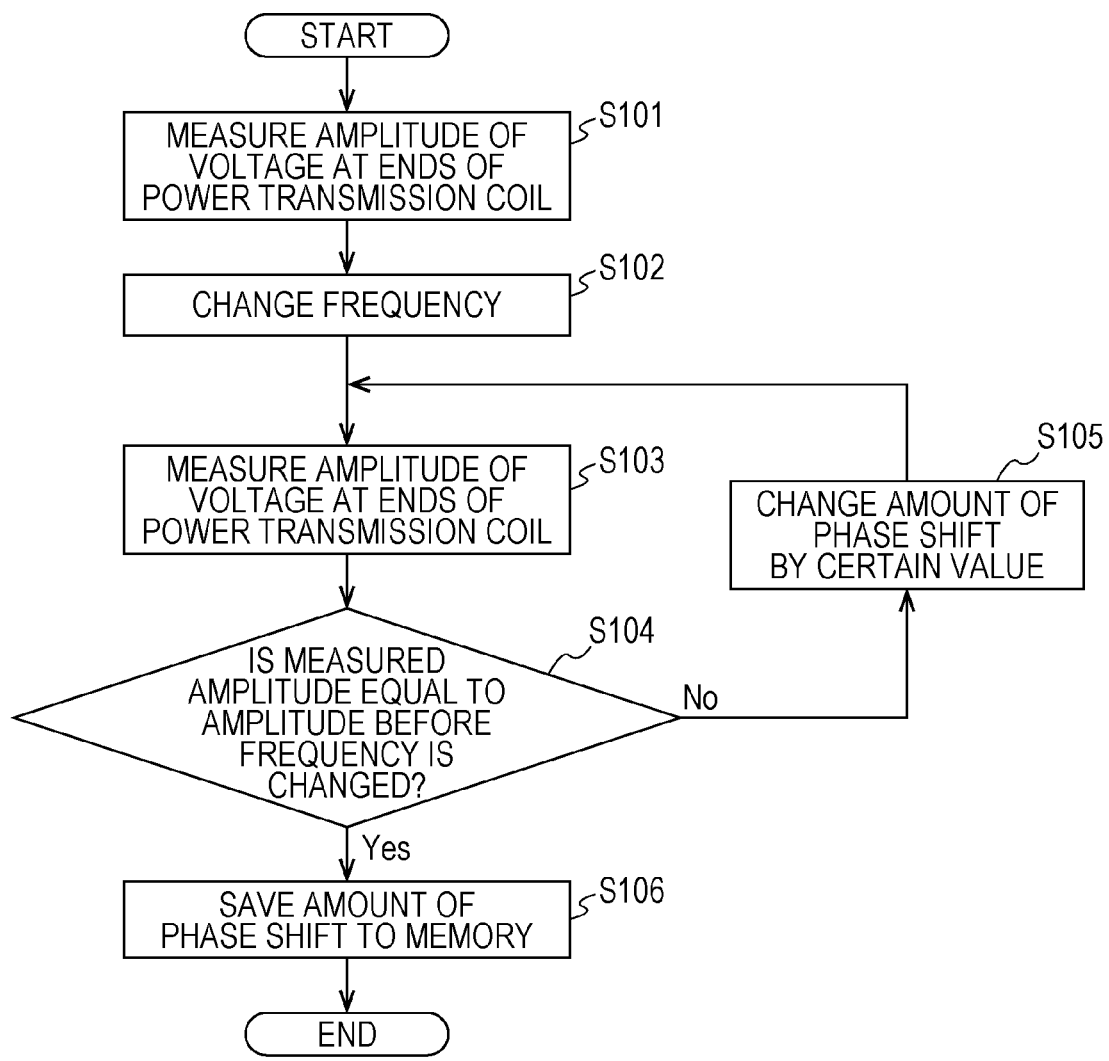
FIG. 8 is a flowchart illustrating an example of operations of the amplitude control performed when the power transmission apparatus transmits Tx data to the power reception apparatus.

FIG. 8 is a flowchart illustrating an example of operations of the amplitude control performed when the power transmission apparatus transmits Tx data to the power reception apparatus.

First, the amplitude detector 1004 measures the amplitude of a voltage (voltage of transmission power) input to the power transmission antenna 1010 (step S101). Next, the power transmission control circuit 1091 changes the frequency of transmission power in accordance with a value of data to be transmitted (step S102). After the frequency is changed, the amplitude detector 1004 again measures the amplitude of the voltage of transmission power (step S103). The measured values of the amplitude of the voltage of transmission power before and after the frequency is changed are transmitted to the power transmission control circuit 1091. The power transmission control circuit 1091 determines whether the amplitude of the voltage of transmission power after the frequency is changed is equal to the amplitude of the voltage of transmission power before the frequency is changed (step S104). If the amplitude after the frequency is changed is not equal to the amplitude before the frequency is changed, the amount of phase shift is changed in steps of a certain value and repeats the measurement of the amplitude of the voltage of transmission power (step S103) until the amplitude after the frequency is changed becomes equal to the amplitude before the frequency is changed (step S105). When the measured amplitude has become equal to the amplitude before the frequency is changed, the power transmission control circuit 1091 saves the amount of phase shift at this time to the memory 1092 (step S106). In doing so, if the frequency is changed next time, the amount of phase shift can immediately enter, using the value saved in the memory 1092, a state in which the amplitude becomes constant.

Figure 9A:
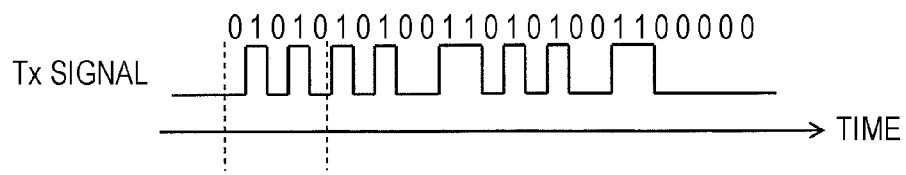
FIG. 9A is a diagram illustrating an example of a Tx signal (e.g., a packet signal) transmitted from the power transmission apparatus to the power reception apparatus.
Figure 9B:
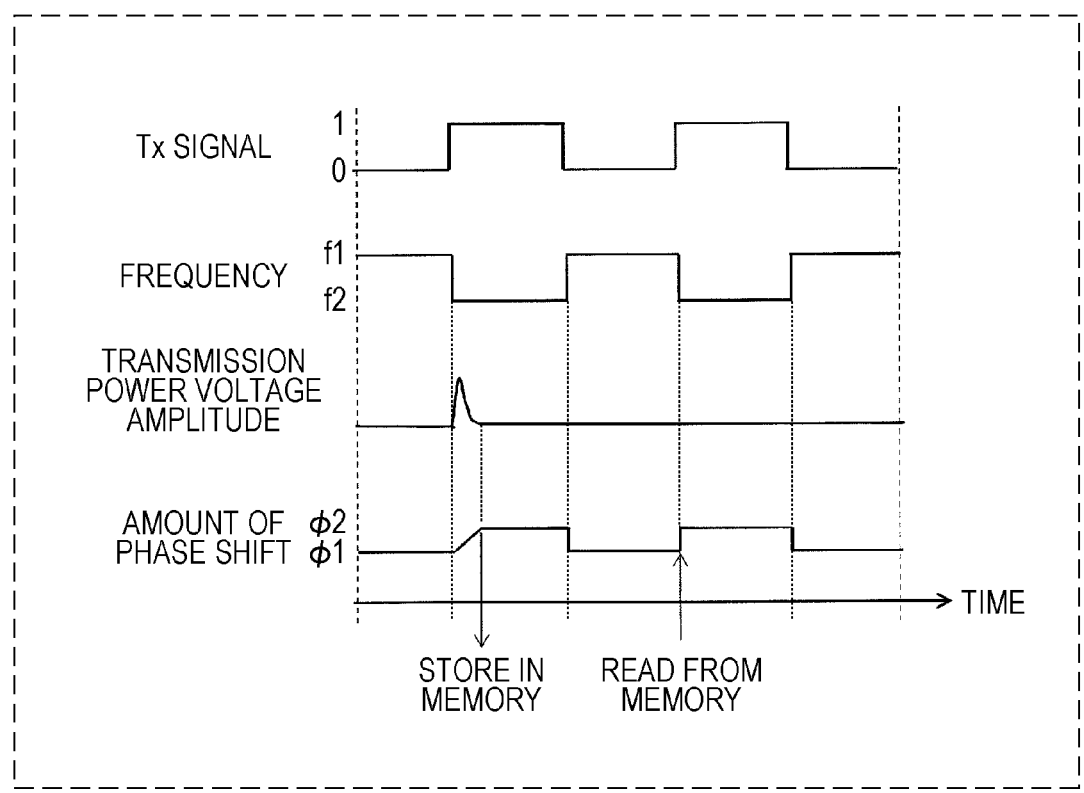
FIG. 9B is a diagram illustrating temporal changes in the Tx signal, the frequency, the amplitude of the voltage of transmission power, and the amount of phase shift in a period defined by two broken lines illustrated in FIG. 9A.

FIG. 9A is a diagram illustrating an example of a Tx signal (e.g., a packet signal) transmitted from the power transmission apparatus to the power reception apparatus. FIG. 9B is a diagram illustrating temporal changes in the Tx signal, the frequency, the amplitude of the voltage of transmission power, and the amount of phase shift in a period defined by two broken lines illustrated in FIG. 9A. When a first signal of a packet is transmitted, the power transmission control circuit 1091 changes the frequency, and the amplitude of the voltage of transmission power changes. The power transmission control circuit 1091 adjusts the amount of phase shift through the operations illustrated in FIG. 8 so that the change becomes smaller. As a result, the amplitude of the voltage of transmission power becomes the same as the amplitude before the frequency is changed. The amount of phase shift at this time is saved to the memory 1092, and the amount of phase shift can be changed next time and later by referring to the value stored in the memory 1092. As a result of these operations, time taken to reset the amplitude of the voltage of transmission power to a state before the frequency is changed can be reduced, and the amplitude of the voltage of transmission power can always be kept constant.

Second Embodiment

Next, a second embodiment of the present disclosure will be described. In the present embodiment, not the full-bridge inverter circuit 1001 illustrated in FIG. 4 but a half-bridge inverter circuit is used. The amplitude of voltage, therefore, is controlled not through the phase control according to the first embodiment but by controlling a duty ratio of a pulse signal input to each switching element. Other points are the same as in the first embodiment. Differences from the first embodiment will be described hereinafter.

Figure 10:
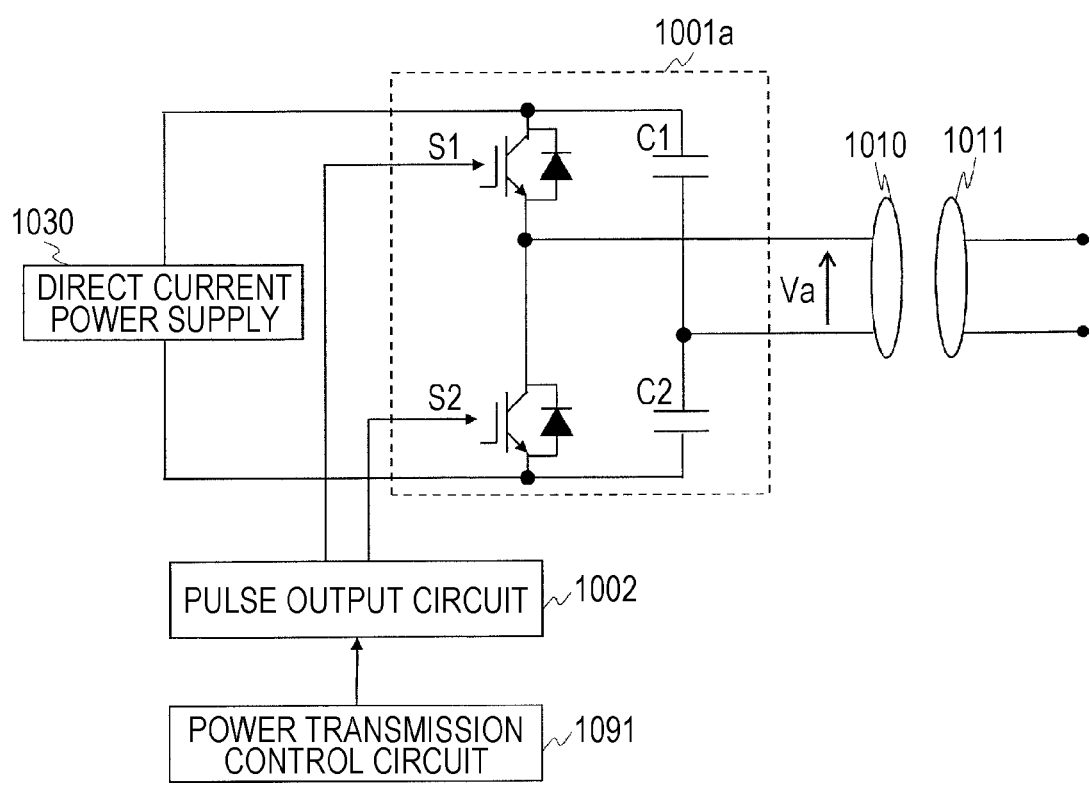
FIG. 10 is a diagram illustrating the circuit configuration of an inverter circuit according to the present embodiment.

FIG. 10 is a diagram illustrating the circuit configuration of an inverter circuit 1001a according to the present embodiment. The inverter circuit 1001a is a half-bridge inverter circuit including two switching elements S1 and S2 and two capacitors. The two switching elements S1 and S2 and two capacitors C1 and C2 are connected parallel to each other. An end of the power transmission antenna 1010 is connected to a point between the two switching elements S1 and S2, and another end is connected to a point between the two capacitors C1 and C2.

The power transmission control circuit 1091 and the pulse output circuit 1002 supply a pulse signal to each switching element such that the switching elements S1 and S2 alternately turn on. As a result, DC power is converted into alternating current power.

Since the number of switching elements is 2, the phase control described in the first embodiment is not applied in the present embodiment. The power transmission control circuit 1091 according to the present embodiment, therefore, adjusts the output time ratio of the output voltage Va by adjusting the duty ratio (that is, a ratio of a period in which the pulse signal is on to one cycle) of each pulse signal. As a result, the amplitude of the voltage of alternating current power input to the power transmission antenna 1010 is adjusted.

Figure 11A:
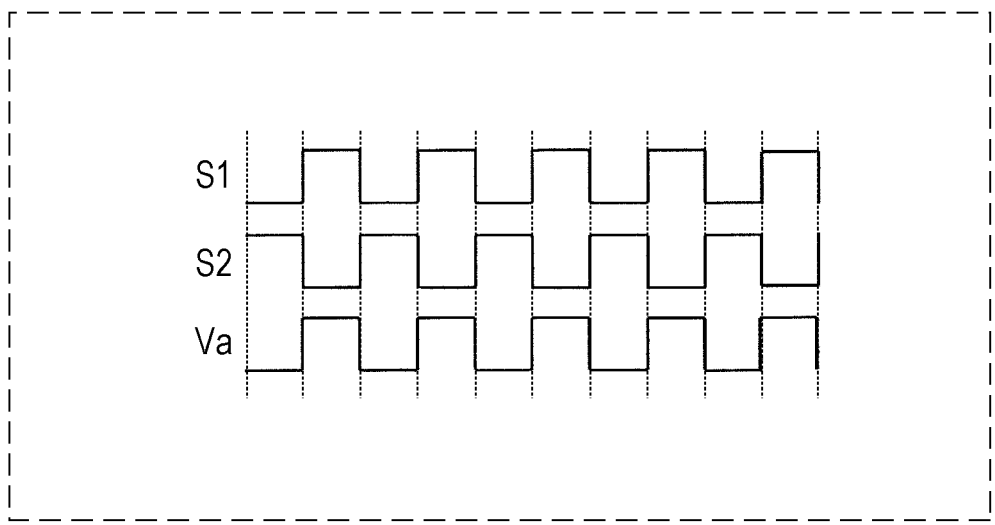
FIG. 11A is a diagram illustrating an example of waveforms of pulse signals input to switching elements and the output voltage at a time when a duty ratio of each pulse signal is 0.5 (50%)
Figure 11B:
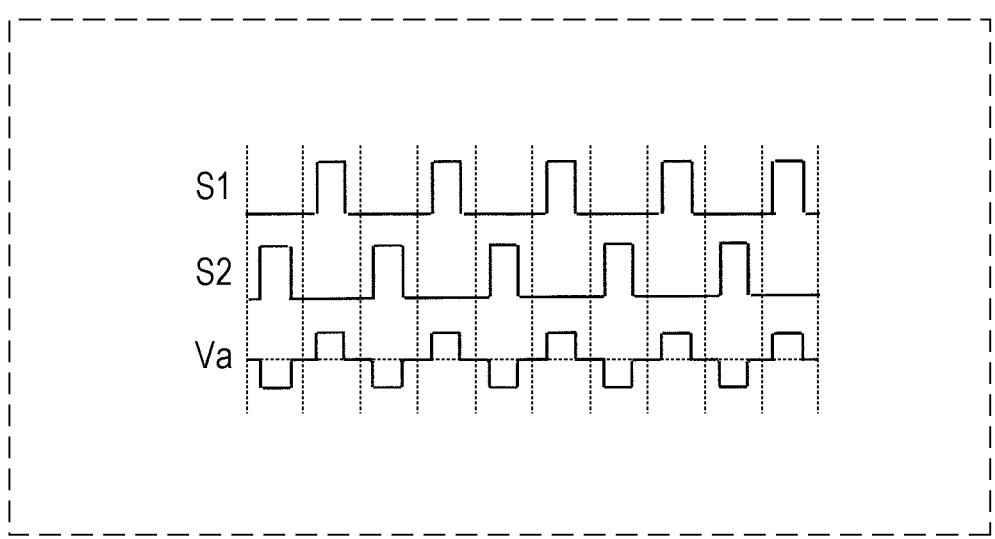
FIG. 11B is a diagram illustrating an example of waveforms of the pulse signals input to the switching elements and the output voltage at a time when the duty ratio of each pulse signal is 0.25 (25%)

FIGS. 11A and 11B are diagrams illustrating the duty control according to the present embodiment. FIG. 11A illustrates an example of the pulse signals input to switching elements S1 and S2 and the output voltage Va at a time when the duty ratio of each pulse signal is 0.5 (50%). FIG. 11B illustrates an example of waveforms of the pulse signals input to the switching elements S1 and S2 and the output voltage Va at a time when the duty ratio of each pulse signal is 0.25 (25%). As illustrated in the figure, by changing the duty ratio, the output time ratio (that is, a period in which the voltage Va is not zero to one cycle) of the voltage Va can be changed. As a result, the amplitude of the smoothed voltage of transmission power, too, can be changed. Such pulse signals whose duty ratios are different from each other are generated, for example, by the pulse output circuit 1002 including a pulse-width modulation (PWM) control circuit. The duty ratio is adjusted within a range of 0% to 50%. When the duty ratio is 50%, the amplitude of the voltage of transmission power becomes largest, and when the duty ratio is 0%, the amplitude of the voltage of transmission power becomes smallest.

When transmitting Tx data to the power reception apparatus, the power transmission control circuit 1091 according to the present embodiment changes the duty ratio in accordance with the modulation of the frequency. More specifically, when decreasing the frequency, the power transmission control circuit 1091 increases the duty ratio, and when increasing the frequency, the power transmission control circuit 1091 decreases the duty ratio.

FIG. 12 is a flowchart illustrating an example of operations performed when Tx data is transmitted according to the present embodiment. Operations in step S101 to S104 are the same as those in steps S101 to S104 illustrated in FIG. 8, respectively, and description thereof is omitted. If, in step S104, the measured amplitude is not equal to the amplitude before the frequency is changed, the power transmission control circuit 1091 changes the duty ratio of each pulse signal by a certain value (step S205). The power transmission control circuit 1091 then repeats the operations in steps S103, S104, and S205 until the measured amplitude becomes equal to the amplitude before the frequency is changed. When the measured amplitude has become equal to the amplitude before the frequency is changed, the power transmission control circuit 1091 saves information regarding the duty ratio at this time to the memory (step S206).

As a result of the above operations, as in the first embodiment, the amplitude of the voltage can be kept constant even if the frequency is changed. Even when the power reception apparatus simultaneously transmits Rx data, therefore, the Rx data can be correctly demodulated on the basis of the amplitude of the voltage of transmission power.

The duty control according to the present embodiment can also be applied to a case where the full-bridge inverter circuit according to the first embodiment is used.

As described above, the present disclosure includes wireless power transmission systems and a power transmission apparatus described in the following items.

Item 1

A wireless power transmission system including a power transmission apparatus including an inverter circuit that converts first direct current power supplied from a power supply into alternating current power and outputs the alternating current power, a power transmission antenna that wirelessly transmits the alternating current power output from the inverter circuit, and a power transmission control circuit that causes the inverter circuit to output the alternating current power and outputs the alternating current power as binary communication data by varying frequency of the alternating current power output from the inverter circuit between a first frequency and a second frequency; and a power reception apparatus including a power reception antenna that receives the alternating current power wirelessly transmitted from the power transmission antenna, and a power reception amplitude modulator that varies amplitude of voltage of the alternating current power input to the power transmission antenna between a first amplitude and a second amplitude, in which, when transmitting first binary communication data to be output from the power transmission antenna to the power reception antenna through electromagnetic coupling between the power transmission antenna and the power reception antenna, the power transmission control circuit selects the first frequency as one of the first binary communication data and the second frequency as another of the first binary communication data, in which, when transmitting second binary communication data from the power reception antenna to the power transmission antenna through the electromagnetic coupling, the power reception amplitude modulator selects the first amplitude as one of the second binary communication data and the second amplitude as another of the second binary communication data, and in which the power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

According to the above aspect, the power transmission control circuit performs, using the inverter circuit, the amplitude control for eliminating the difference between the third amplitude (V3) of the voltage of the alternating current power at a time when the frequency of the alternating current power is the first frequency and the fourth amplitude (V4) of the voltage of the alternating current power at a time when the frequency of the alternating current power is the second frequency.

Since almost no difference is left between the amplitude (V3) of the voltage of the alternating current power at a time when the frequency of the alternating current power is the first frequency (f1) and the amplitude (V4) of the voltage of the alternating current power at a time when the frequency of the alternating current power is the second frequency (f2) as a result of the amplitude control, an incorrect determination as in the existing art can be avoided. Even if either the power transmission apparatus or the power reception apparatus is transmitting data, therefore, the other can transmit data at the same time. It is to be noted that "eliminating a difference" does not mean that the difference becomes exactly zero (0), but there may be a slight difference.

Item 2

The wireless power transmission system according to Item 1, in which the third amplitude and the fourth amplitude after the amplitude control in the power transmission apparatus correspond to either the first amplitude or the second amplitude achieved by the variation performed by the power reception amplitude modulator in the power reception apparatus.

According to the above aspect, since the third amplitude (V3) and the fourth amplitude (V4) after the amplitude control performed by the power transmission apparatus correspond to, that is, become the same as, either the first amplitude (V1) or the second amplitude (V2) achieved by the variation through amplitude modulation performed by the power reception apparatus, the power transmission apparatus can correctly detect the second binary communication data transmitted from the power reception apparatus while transmitting the first binary communication data to the power reception apparatus.

Item 3

The wireless power transmission system according to Item 1 or 2, in which the transmission of the second binary communication data from the power reception antenna to the power transmission antenna is performed at the same time as the transmission of the first binary communication data from the power transmission antenna to the power reception antenna.

According to the above aspect, since the transmission of the first binary communication data and the transmission of the second binary communication data are simultaneously performed, a delay in communication can be reduced.

Item 4

The wireless power transmission system according to any of Items 1 to 3, in which the power transmission apparatus includes an amplitude detector that detects amplitude of voltage of the alternating current power transmitted from the power transmission antenna, and in which the power reception apparatus includes a frequency detector that detects frequency of the alternating current power received by the power reception antenna.

According to the above aspect, the power transmission apparatus can detect, using the amplitude detector, the second binary communication data from the power reception apparatus, and the power reception apparatus can detect, using the frequency detector, the first binary communication data from the power transmission apparatus.

Item 5

The wireless power transmission system according to any of Items 1 to 4, in which the power transmission control circuit performs, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency on the basis of a result of the detection performed by an amplitude detection circuit.

According to the above aspect, the power transmission control circuit can adjust the third amplitude (V3) at a time when the frequency is the first frequency to the fourth amplitude (V4) at a time when the frequency is the second frequency on the basis of a result of the detection performed by the amplitude detection circuit, incorrect detection can be prevented during bidirectional communication.

Item 6

The wireless power transmission system according to any of Items 1 to 5, in which, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory.

According to the above aspect, once the control for adjusting the third amplitude (V3) to the fourth amplitude (V4) has been performed, next and later operations of the amplitude control can be performed using the parameter saved in the memory. Processing, therefore, can be performed at higher speed.

Item 7

The wireless power transmission system according to any of Items 1 to 6, in which the electromagnetic coupling between the power transmission antenna and the power reception antenna includes magnetic field coupling or electric field coupling.

According to the above aspect, power can be wirelessly transmitted through either magnetic field coupling between coils or electric field coupling between electrodes.

Item 8

The wireless power transmission system according to any of Items 1 to 7, in which the inverter circuit includes four switching elements, in which the four switching elements include a first switching element pair that, when conductive, outputs a voltage having the same polarity as voltage of the first direct current power supplied from the power supply and a second switching element pair that, when conductive, outputs a voltage having an opposite polarity to the voltage of the first direct current power, in which the power transmission control circuit supplies a pulse signal for switching a conductive/non-conductive state to each of the four switching elements, and in which the amplitude control is performed by adjusting a phase difference between two pulse signals supplied to the first switching element pair and a phase difference between two pulse signals supplied to the second switching element pair.

According to the above aspect, the amplitude control can be performed through simple control for adjusting the phase difference between the two pulse signals using a full-bridge inverter circuit.

Item 9

The wireless power transmission system according to any of Items 1 to 8, in which, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory, and in which the parameter is a value indicating the phase differences between the two pulse signals at a time when the control for adjusting to the fourth amplitude of the voltage of the alternating current power at a time when the frequency of the alternating current power is the second frequency is performed.

According to the above aspect, once the amplitude control has been performed, the value saved in the memory indicating the phase difference can be used in next and later operations. Processing, therefore, can be performed at higher speed.

Item 10

The wireless power transmission system according to any of Items 1 to 9, in which the inverter circuit includes a plurality of switching elements, in which the power transmission control circuit supplies a pulse signal for switching a conductive/non-conductive state to each of the plurality of switching elements, and in which the amplitude control is performed by adjusting a duty ratio of the pulse signals.

According to the above aspect, since the amplitude control can be performed by adjusting the duty ratio of the pulse signal supplied to each of the plurality of switching elements, the amplitude control can be performed not only by a full-bridge inverter but also, for example, by a half-bridge inverter.

Item 11

The wireless power transmission system according to any of Items 1 to 10, in which, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory, and in which the parameter is a value indicating the duty ratio at a time when the control for adjusting to the fourth amplitude of the voltage of the alternating current power at a time when the frequency of the alternating current power is the second frequency is performed.

According to the above aspect, once the amplitude control has been performed, the value saved in the memory indicating the duty ratio can be used in next and later operations. Processing, therefore, can be performed at higher speed.

Item 12

A power transmission apparatus in a wireless power transmission system including the power transmission apparatus and a power reception apparatus, the power transmission apparatus including an inverter circuit that converts first direct current power supplied from a power supply into alternating current power and outputs the alternating current power, a power transmission antenna that wirelessly transmits the alternating current power output from the inverter circuit, and a power transmission control circuit that causes the inverter circuit to output the alternating current power and outputs the alternating current power as binary communication data by varying frequency of the alternating current power output from the inverter circuit between a first frequency and a second frequency, in which the power reception apparatus includes a power reception antenna that receives the alternating current power wirelessly transmitted from the power transmission antenna, and a power reception amplitude modulator that varies amplitude of voltage of the alternating current power input to the power transmission antenna between a first amplitude and a second amplitude, in which, when transmitting first binary communication data from the power transmission antenna to the power reception antenna through electromagnetic coupling between the power transmission antenna and the power reception antenna, the power transmission control circuit selects the first frequency as one of the first binary communication data and the second frequency as another of the first binary communication data, in which, when transmitting second binary communication data from the power reception antenna to the power transmission antenna through the electromagnetic coupling, the power reception amplitude modulator selects the first amplitude as one of the second binary communication data and the second amplitude as another of the second binary communication data, and in which the power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

The techniques in the present disclosure can be used, for example, for devices necessary to supply power and transmit bidirectional data in real-time, such as monitoring cameras and robots. According to the embodiments of the present disclosure, a power transmission apparatus and a power reception apparatus can bidirectionally transmit data in a full-duplex manner.

What is claimed is:

1. A wireless power transmission system comprising:
   a power transmission apparatus including
      an inverter circuit that converts first direct current power supplied from a power supply into alternating current power and outputs the alternating current power,
      a power transmission antenna that wirelessly transmits the alternating current power output from the inverter circuit, and
      a power transmission control circuit that causes the inverter circuit to output the alternating current power and outputs the alternating current power as binary communication data by varying frequency of the alternating current power output from the inverter circuit between a first frequency and a second frequency; and
   a power reception apparatus including
      a power reception antenna that receives the alternating current power wirelessly transmitted from the power transmission antenna, and
      a power reception amplitude modulator that varies amplitude of voltage of the alternating current power input to the power transmission antenna between a first amplitude and a second amplitude,
   wherein, when transmitting first binary communication data to be output from the power transmission antenna to the power reception antenna through electromagnetic coupling between the power transmission antenna and the power reception antenna, the power transmission control circuit selects the first frequency as one of the first binary communication data and the second frequency as another of the first binary communication data,
   wherein, when transmitting second binary communication data from the power reception antenna to the power transmission antenna through the electromagnetic coupling, the power reception amplitude modulator selects the first amplitude as one of the second binary communication data and the second amplitude as another of the second binary communication data, and
   wherein the power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

2. The wireless power transmission system according to claim 1,
   wherein the third amplitude and the fourth amplitude after the amplitude control in the power transmission apparatus correspond to either the first amplitude or the second amplitude achieved by the variation performed by the power reception amplitude modulator in the power reception apparatus.

3. The wireless power transmission system according to claim 1,
   wherein the transmission of the second binary communication data from the power reception antenna to the power transmission antenna is performed at the same time as the transmission of the first binary communication data from the power transmission antenna to the power reception antenna.

4. The wireless power transmission system according to claim 1, wherein the power transmission apparatus includes an amplitude detector that detects amplitude of voltage of the alternating current power transmitted from the power transmission antenna, and wherein the power reception apparatus includes a frequency detector that detects frequency of the alternating current power received by the power reception antenna.

5. The wireless power transmission system according to claim 1, wherein the power transmission control circuit performs, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency on the basis of a result of the detection performed by an amplitude detection circuit.

6. The wireless power transmission system according to claim 1, wherein, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory.

7. The wireless power transmission system according to claim 1, wherein the electromagnetic coupling between the power transmission antenna and the power reception antenna includes magnetic field coupling or electric field coupling.

8. The wireless power transmission system according to claim 1, wherein the inverter circuit includes four switching elements, wherein the four switching elements include a first switching element pair that, when conductive, outputs a voltage having the same polarity as voltage of the first direct current power supplied from the power supply and a second switching element pair that, when conductive, outputs a voltage having an opposite polarity to the voltage of the first direct current power, wherein the power transmission control circuit supplies a pulse signal for switching a conductive/non-conductive state to each of the four switching elements, and wherein the amplitude control is performed by adjusting a phase difference between two pulse signals supplied to the first switching element pair and a phase difference between two pulse signals supplied to the second switching element pair.

9. The wireless power transmission system according to claim 8, wherein, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory, and wherein the parameter is a value indicating the phase differences between the two pulse signals at a time when the control for adjusting to the fourth amplitude of the voltage of the alternating current power at a time when the frequency of the alternating current power is the second frequency is performed.

10. The wireless power transmission system according to claim 1, wherein the inverter circuit includes a plurality of switching elements, wherein the power transmission control circuit supplies a pulse signal for switching a conductive/non-conductive state to each of the plurality of switching elements, and wherein the amplitude control is performed by adjusting a duty ratio of the pulse signals.

11. The wireless power transmission system according to claim 10, wherein, after performing, in the amplitude control, control for adjusting the third amplitude of the voltage of the alternating current power at a time when the frequency of the alternating current power is the first frequency to the fourth amplitude of the voltage of the alternating current power at a time when the frequency of the alternating current power is the second frequency, the power transmission control circuit saves a parameter corresponding to a difference in the amplitude of the voltage of the alternating current power to a memory, and wherein the parameter is a value indicating the duty ratio at a time when the control for adjusting to the fourth amplitude of the voltage of the alternating current power at a time when the frequency of the alternating current power is the second frequency is performed.

12. A power transmission apparatus in a wireless power transmission system including the power transmission apparatus and a power reception apparatus, the power transmission apparatus comprising:

an inverter circuit that converts first direct current power supplied from a power supply into alternating current power and outputs the alternating current power;

a power transmission antenna that wirelessly transmits the alternating current power output from the inverter circuit; and a power transmission control circuit that causes the inverter circuit to output the alternating current power and outputs the alternating current power as binary communication data by varying frequency of the alternating current power output from the inverter circuit between a first frequency and a second frequency, wherein the power reception apparatus includes a power reception antenna that receives the alternating current power wirelessly transmitted from the power transmission antenna, and a power reception amplitude modulator that varies amplitude of voltage of the alternating current power input to the power transmission antenna between a first amplitude and a second amplitude, wherein, when transmitting first binary communication data from the power transmission antenna to the power reception antenna through electromagnetic coupling between the power transmission antenna and the power reception antenna, the power transmission control circuit selects the first frequency as one of the first binary communication data and the second frequency as another of the first binary communication data, wherein, when transmitting second binary communication data from the power reception antenna to the power transmission antenna through the electromagnetic coupling, the power reception amplitude modulator selects the first amplitude as one of the second binary communication data and the second amplitude as another of the second binary communication data, and wherein the power transmission control circuit performs, using the inverter circuit, amplitude control for eliminating a difference between a third amplitude of the voltage of the alternating current power at a time when the frequency of the alternating current power is the first frequency and a fourth amplitude of the voltage of the alternating current power at a time when the frequency of the alternating current power is the second frequency.

* * * * *